United States Patent
Shanmugam et al.

(10) Patent No.: US 11,851,615 B2
(45) Date of Patent: Dec. 26, 2023

(54) BRANCHED BLOCK COPOLYMER FOR ENHANCED OIL RECOVERY IN SANDSTONE FORMATIONS

(71) Applicant: Saudi Arabian Oil Company, Dhahran (SA)

(72) Inventors: Sivaprakash Shanmugam, Houston, TX (US); Carl Thaemlitz, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/592,585

(22) Filed: Feb. 4, 2022

(65) Prior Publication Data
US 2022/0243121 A1 Aug. 4, 2022

Related U.S. Application Data

(60) Provisional application No. 63/145,570, filed on Feb. 4, 2021, provisional application No. 63/145,565, filed on Feb. 4, 2021, provisional application No. 63/145,568, filed on Feb. 4, 2021, provisional application No. 63/145,571, filed on Feb. 4, 2021.

(51) Int. Cl.
*C09K 8/88* (2006.01)
*C09K 8/588* (2006.01)

(52) U.S. Cl.
CPC .............. *C09K 8/887* (2013.01); *C09K 8/588* (2013.01)

(58) Field of Classification Search
None
See application file for complete search history.

(56) References Cited

U.S. PATENT DOCUMENTS

| | | | |
|---|---|---|---|
| 6,715,568 B1 | 4/2004 | Bailey | |
| 10,280,101 B2 | 5/2019 | Miller et al. | |
| 2004/0059054 A1* | 3/2004 | Lopez | C09K 8/592 525/54.31 |
| 2004/0102331 A1* | 5/2004 | Chan | C09K 8/88 507/100 |

(Continued)

FOREIGN PATENT DOCUMENTS

| | | |
|---|---|---|
| CA | 2980510 A1 | 10/2016 |
| WO | 0078891 A1 | 12/2000 |

(Continued)

OTHER PUBLICATIONS

U.S. Office Action dated Feb. 15, 2023 pertaining to U.S. Appl. No. 17/592,058, filed Feb. 3, 2022, 18 pages.

(Continued)

*Primary Examiner* — John J Figueroa
(74) *Attorney, Agent, or Firm* — DINSMORE & SHOHL LLP

(57) ABSTRACT

A method of polymer flooding within a sandstone formation the method comprising: injecting a treatment fluid composition into a wellbore, the treatment fluid composition comprising: a base fluid, and a viscosifier comprising a branched block copolymer wherein the branched block copolymer is a crosslinked, polymerized reaction product of crosslinker C and monomer A and monomer B and monomer D; and increasing hydrocarbon production from the wellbore.

13 Claims, 18 Drawing Sheets

(56) References Cited

U.S. PATENT DOCUMENTS

| | | | |
|---|---|---|---|
| 2005/0038199 A1* | 2/2005 | Wang | C09K 8/12 |
| | | | 524/386 |
| 2008/0114128 A1 | 5/2008 | Destarac et al. | |
| 2009/0260820 A1 | 10/2009 | Kurian et al. | |
| 2010/0120637 A1 | 5/2010 | Bendejacq et al. | |
| 2010/0175880 A1* | 7/2010 | Wang | E21B 36/003 |
| | | | 166/308.5 |
| 2016/0139588 A1* | 5/2016 | Huang | G05B 19/19 |
| | | | 700/275 |
| 2016/0251564 A1* | 9/2016 | Gamage | C04B 28/08 |
| | | | 507/226 |
| 2017/0051196 A1 | 2/2017 | Galindo et al. | |
| 2018/0112120 A1 | 4/2018 | Cadix et al. | |
| 2018/0230355 A1 | 8/2018 | Zha et al. | |
| 2019/0185740 A1 | 6/2019 | Jung et al. | |
| 2019/0194397 A1 | 6/2019 | Jakubowski et al. | |
| 2019/0277122 A1* | 9/2019 | Mahmoud | C09K 8/74 |
| 2022/0242786 A1 | 8/2022 | Shanmugam et al. | |
| 2022/0243113 A1 | 8/2022 | Shanmugam et al. | |
| 2022/0243114 A1 | 8/2022 | Shanmugam et al. | |

FOREIGN PATENT DOCUMENTS

| | | |
|---|---|---|
| WO | 2012058255 A2 | 5/2012 |
| WO | 2014036498 A2 | 3/2014 |
| WO | 2015049378 A1 | 4/2015 |

OTHER PUBLICATIONS

U.S. Office Action dated Feb. 27, 2023 pertaining to U.S. Appl. No. 17/592,053, filed Feb. 3, 2022, 31 pages.

Carvente et al., "Synthesis of linear and branched hydrophobically associating multiblock copolymers via a one-pot process" Journal of Polymer Research (2002) 27:200 (Year: 2002).

Yuan et al., "Synthesis and properties of high oil-absorbing resin" Huaxue Gongye Yu Gongcheng Jishu vol. 31, Issue: 6, pp. 26-30 (Year: 2010).

Tiemeyer et al., "Systhesis, Characterization, and Working Mechanism of a Synthetic High Temperature (200) Fluid Loss Polymer for Oil Well Cementing Containing Allyloxy-2-hydroxy Propane Sulfonic (AHPS) Acid Monomer" Journal of Applied Polymer Science 2013, 851-8560 (Year: 2013).

Cadix et al., "Diblock Copolymers: A New Class of Fluid Loss Control Additive for Oilfield Cementing", Society of Petroleum Engineers, SPE-173758-MX, 2015.

Cadix et al., "High Temperature Cementing: Fluid Loss Control Polymers Performance and Limitations", Society of Petroleum Engineers, SPE-183129-MS, 2016.

Cadix et al., "Short Term Gas Migration Control in Well Cementing: Comparative Behavior of Fluid Loss Control Polymers", Society of Petroleum Engineers, SPE-184564-MS, 2017.

Goh et al., "Rheology of core cross-linked star polymers", Polymer, vol. 49, pp. 5095-5104, 2008.

Jouenne, "Polymer flooding in high temperature, high salinity conditions: Selection of polymer type and polymer chemistry, thermal stability", Journal of Petroleum Science and Engineering, vol. 195, 107545, 2020.

Liu et al., "Synthesis and characterization of comb-shaped copolymer as a filtration reducer and comparison with counterparts", Royal Society of Chemistry, RSC Advances, vol. 8, pp. 11424-11435, 2018.

Zhao et al., "Synthesis and evaluation of a novel clean hydraulic fracturing fluid based on star-dendritic polymer", Journal of Natural Gas Science and Engineering, Journal of Natural Gas Science and Engineering, vol. 43, pp. 179-189, 2017.

Notification of Transmittal of the International Search Report and the Written Opinion of the International Searching Authority, or the Declaration dated May 9, 2022 pertaining to International application No. PCT/US2022/015184 filed Feb. 4, 2022, pp. 1-16.

* cited by examiner

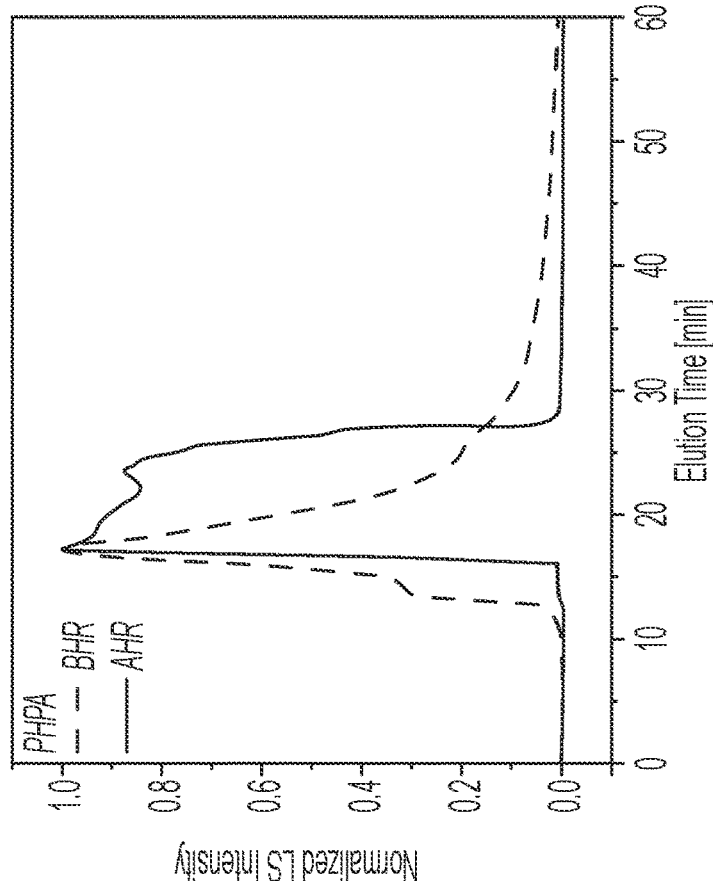
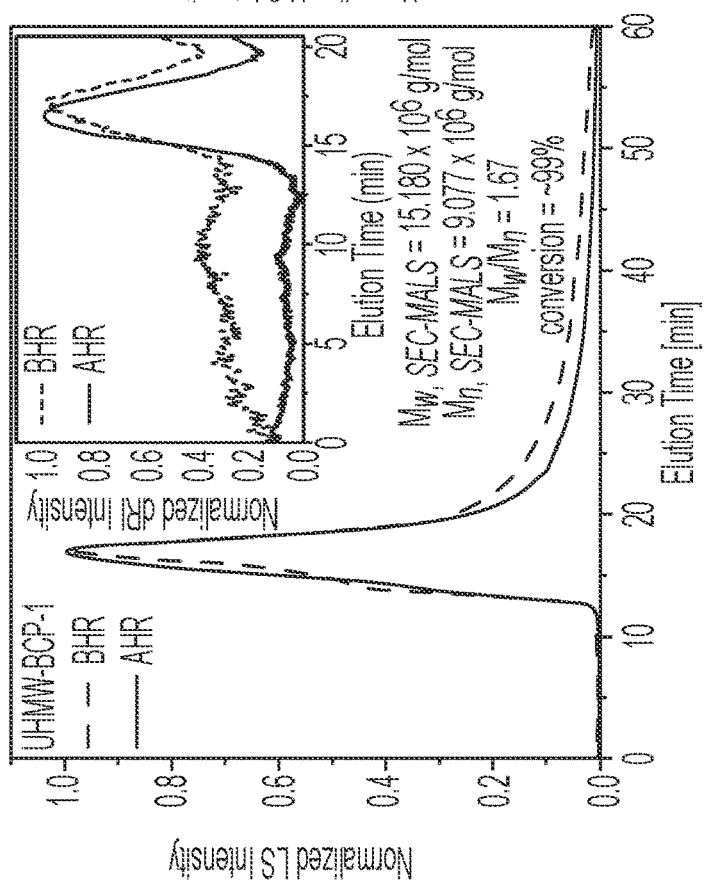
FIG. 14A
FIG. 14B

BRANCHED BLOCK COPOLYMER FOR ENHANCED OIL RECOVERY IN SANDSTONE FORMATIONS

CROSS-REFERENCE TO RELATED APPLICATION

This application claims priority to U.S. Provisional Application No. 63/145,570, filed Feb. 4, 2021, U.S. Provisional Application No. 63/145,565, filed on Feb. 4, 2021, U.S. Provisional Application No. 63/145,568, filed on Feb. 4, 2021, and U.S. Provisional Application No. 63/145,571, filed on Feb. 4, 2021, the entirety of which is incorporated herein by reference.

TECHNICAL FIELD

Embodiments of the present disclosure generally relate to branched block copolymers for use in enhanced oil recovery (EOR) treatment fluids.

BACKGROUND

The discovery and extraction of hydrocarbons, such as oil or natural gas, from subterranean formations, may be impeded for a variety of reasons, such as inherently poor permeability or damage to the formation. The production rate of hydrocarbons from a hydrocarbon-producing region of the formation may be reduced compared to the expected production rate. In these instances, methods for obtaining enhanced oil recovery from the hydrocarbon-producing regions of the formation can be utilized to improve hydrocarbon production. Enhanced Oil Recovery (EOR) methods may include chemical flooding of the formation using alkaline or micellar-polymer, miscible displacement of the hydrocarbons left in pore space using carbon dioxide injection or hydrocarbon injection, and thermal recovery using steamflood or in-situ combustion. The optimal application of each type depends on formation temperature, pressure, depth, net pay, permeability, residual oil and water saturations, porosity, and fluid properties of the oil, such as specific gravity and viscosity. However, in some cases, treatment materials used in EOR methods may flow out of the hydrocarbon-producing region in which the EOR treatment is being conducted and into other regions of the formation. Flow of treatment materials into other regions of the formation can result in loss of treatment materials and an increase in the quantity of treatment materials required to conduct the EOR treatment.

SUMMARY

Adding elastomers to cement slurry can be vital to the elasticity, strength, and performance properties of the cured cement composition. However, conventional aqueous latex fluids contain limited amounts of elastomer additive, leading to too little elastomer throughout the set cement, as adding too much aqueous fluid can lead to an inability for the cement to set. Furthermore, too little elastomer leads to cured cements without self-healing capabilities.

Accordingly, there is an ongoing need for cement slurries that are resistant to cyclic stresses, elastic in nature, and exhibit self-healing capabilities. Furthermore, cured cements that are elastic prevent cracking and breaking under cyclic stresses. The present embodiments address these needs by providing cement slurries and methods of making and using cement slurries that include a block copolymer composition.

In embodiments of the present disclosure, a method of polymer flooding within a sandstone formation the method includes injecting a treatment fluid composition into a wellbore, the treatment fluid composition comprising: a base fluid, and a viscosifier comprising a branched block copolymer wherein the branched block copolymer is a cross-linked, polymerized reaction product of crosslinker C and monomer A and monomer B and monomer D; and increasing hydrocarbon production from the wellbore.

Additional features and advantages of the described embodiments will be set forth in the detailed description which follows, and in part will be readily apparent to those skilled in the art from that description or recognized by practicing the described embodiments, including the detailed description which follows as well as the claims.

SUMMARY

Figure 1:
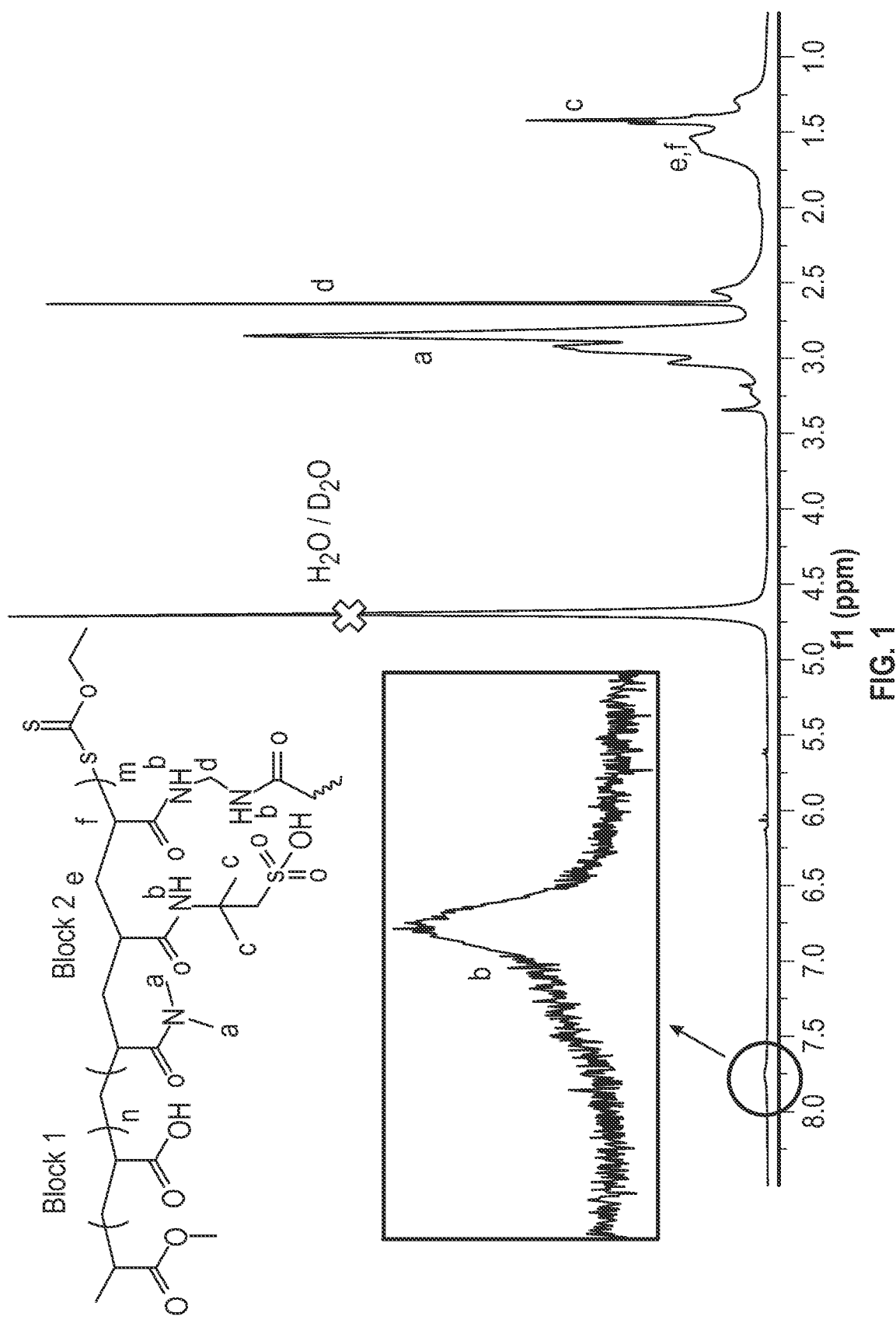
FIG. 1 illustrates an H-NMR graph of the ultra-high molecular weight (UHMW) branched block copolymer according to one or more embodiments disclosed herein.
Figure 2:
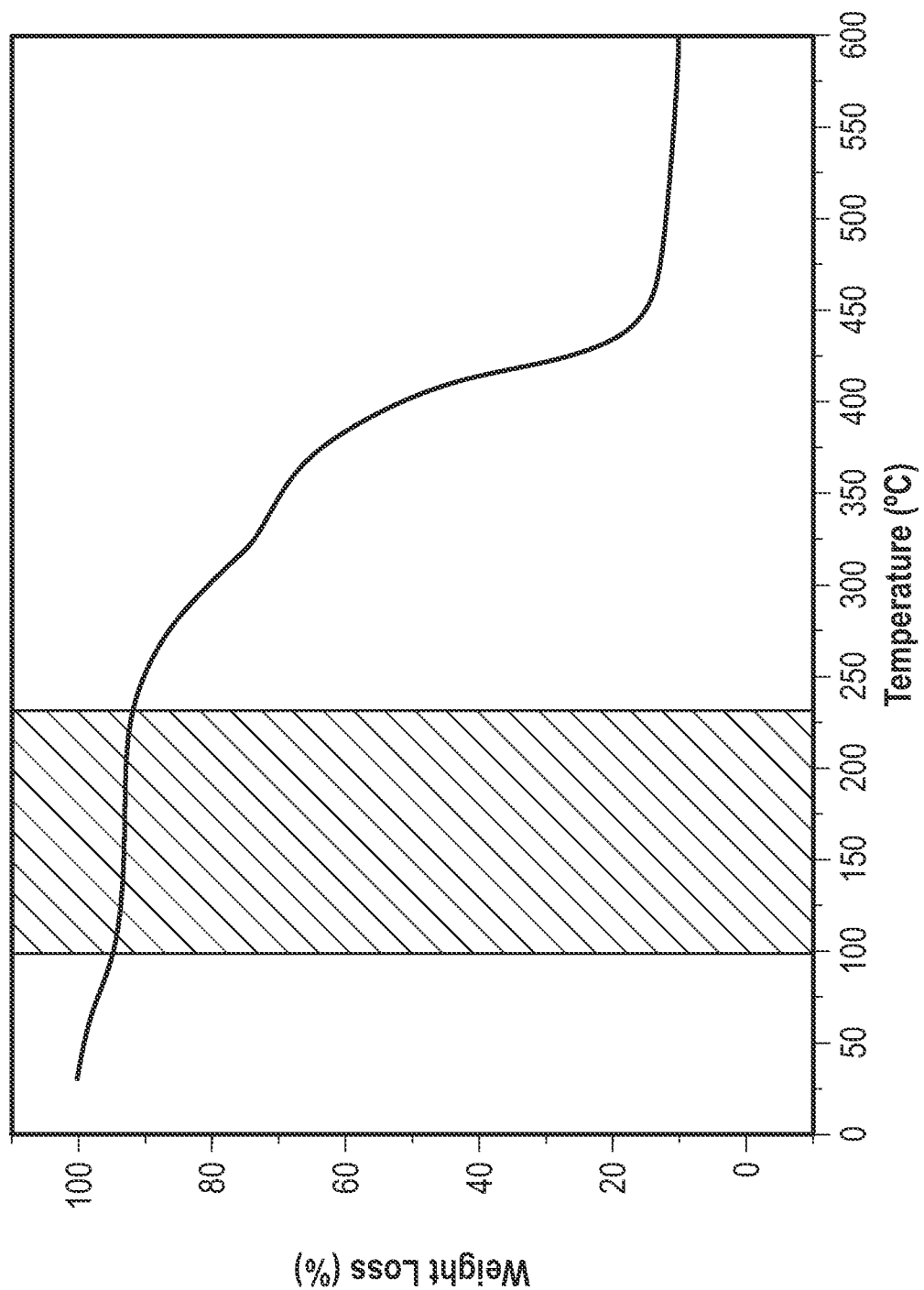
FIG. 2 illustrates the UHMW branched block copolymer weight loss as a function of temperature according to one or more embodiments disclosed herein.
Figure 3A:
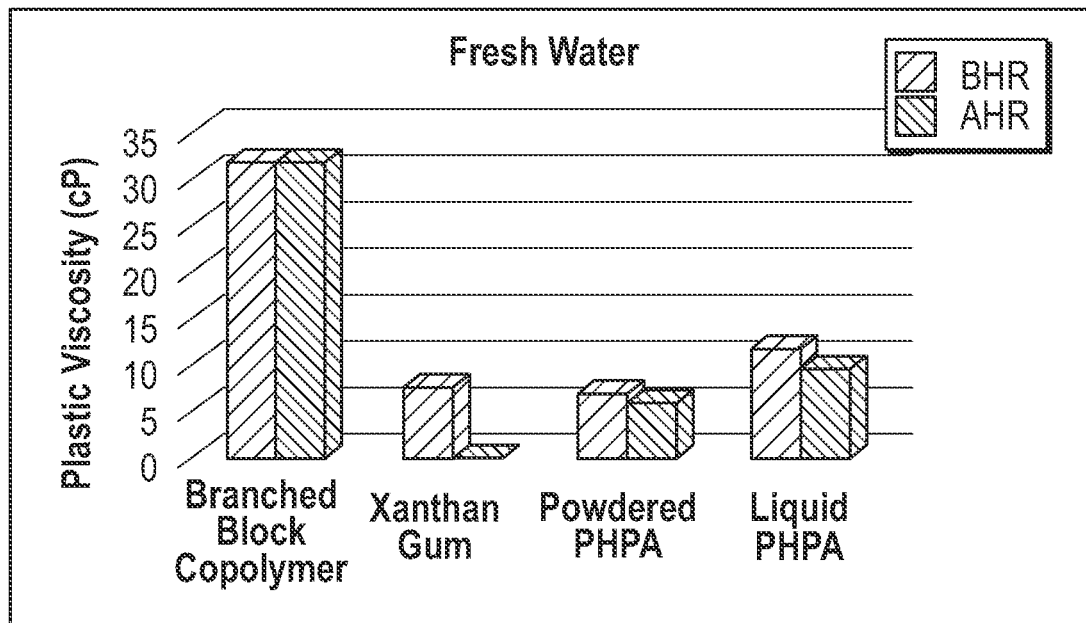
Figure 3B:
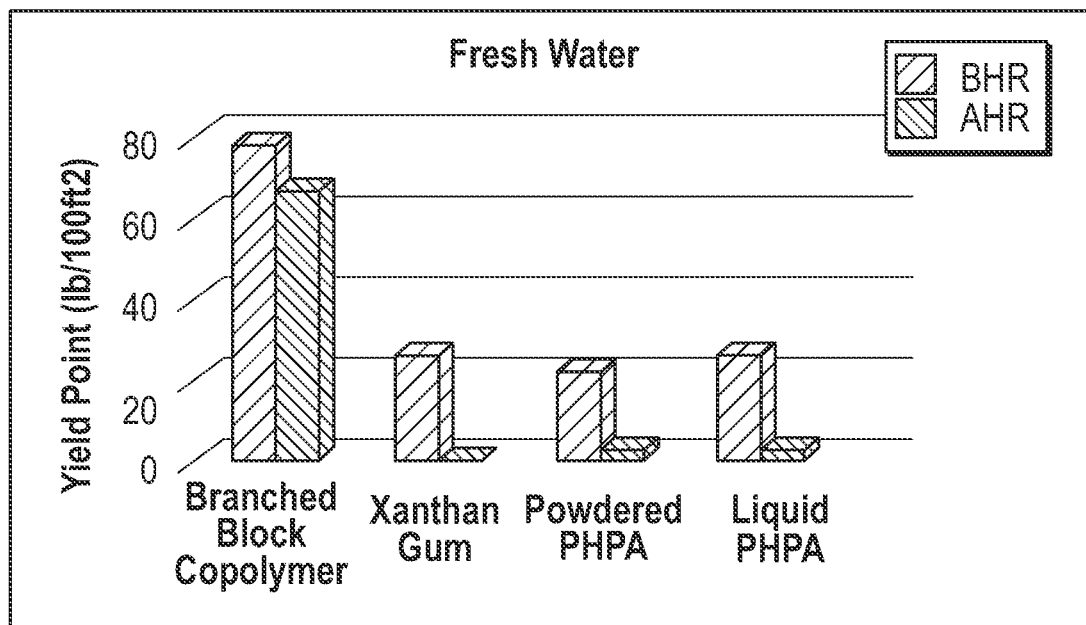

FIGS. 3A and 3B compare rheological properties of the UHMW branched block copolymer according to one or more embodiments disclosed herein with those of commercially available viscosifiers.

Figure 4A:
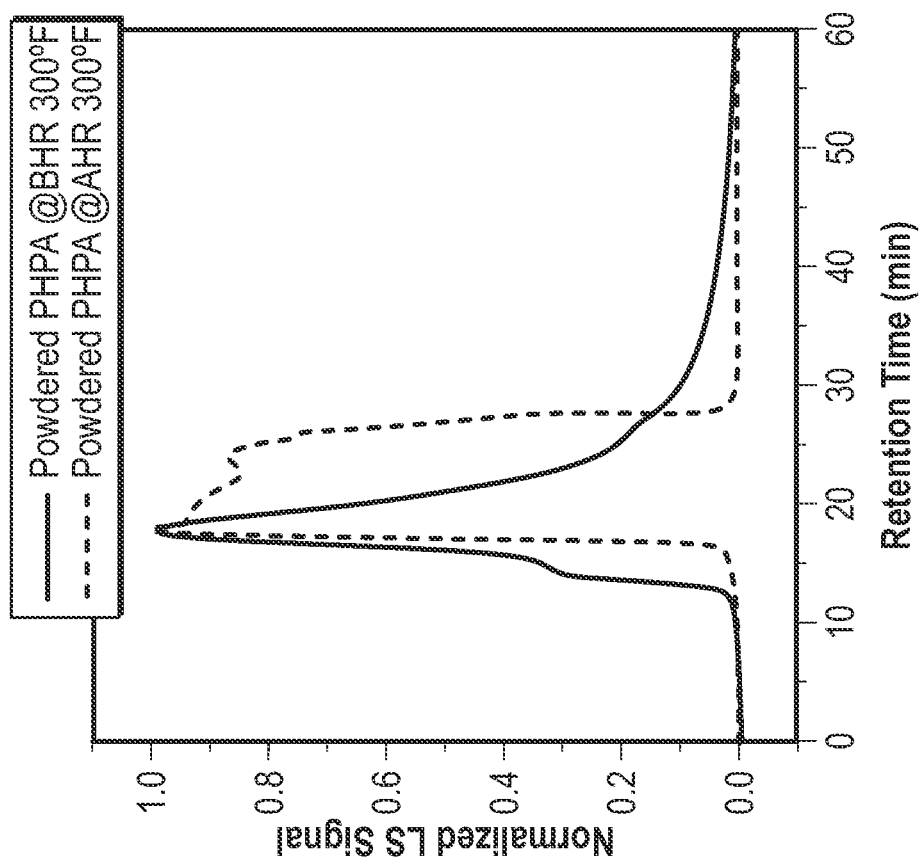
Figure 4B:
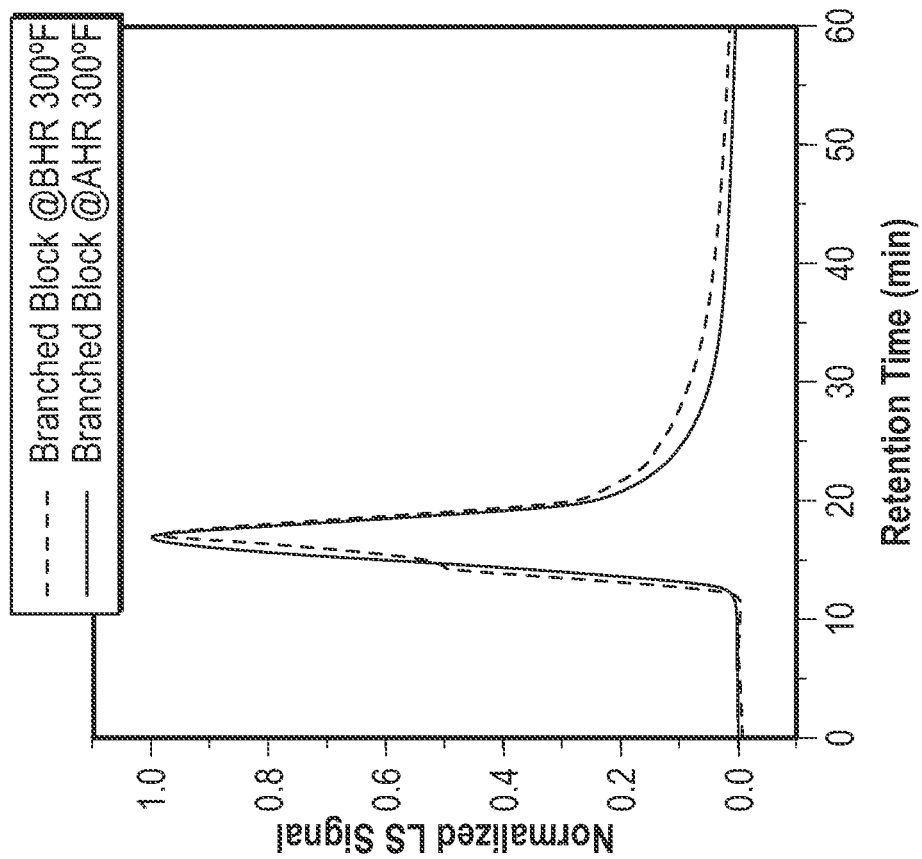

FIGS. 4A and 4B compare molecular weights before and after hot rolling of the UHMW branched block copolymer according to one or more embodiments disclosed herein with those of commercially available viscosifiers.

Figure 5A:
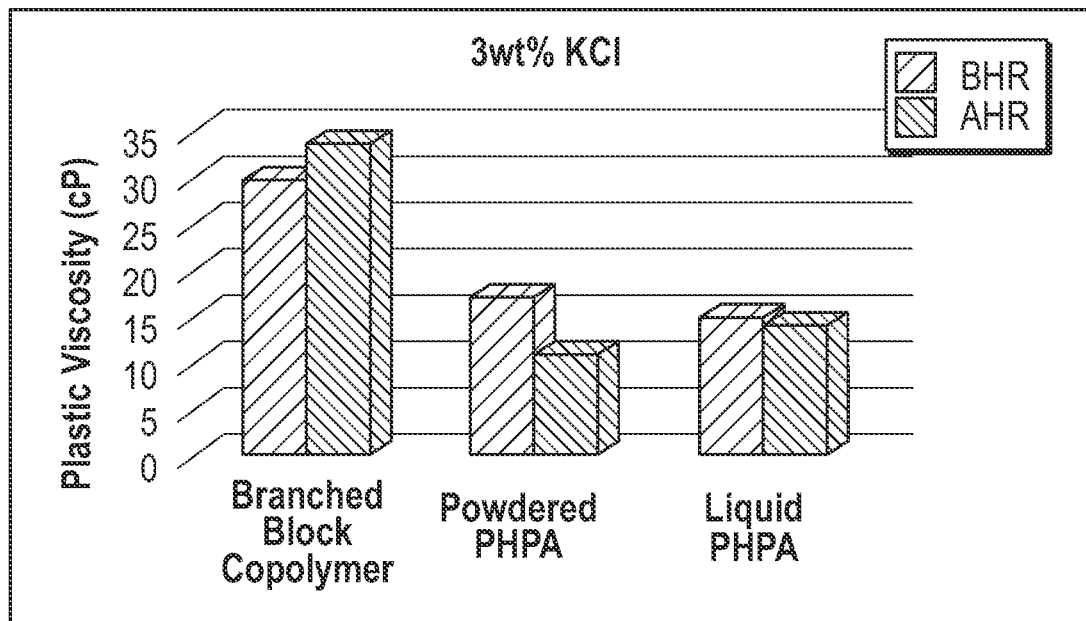
Figure 5B:
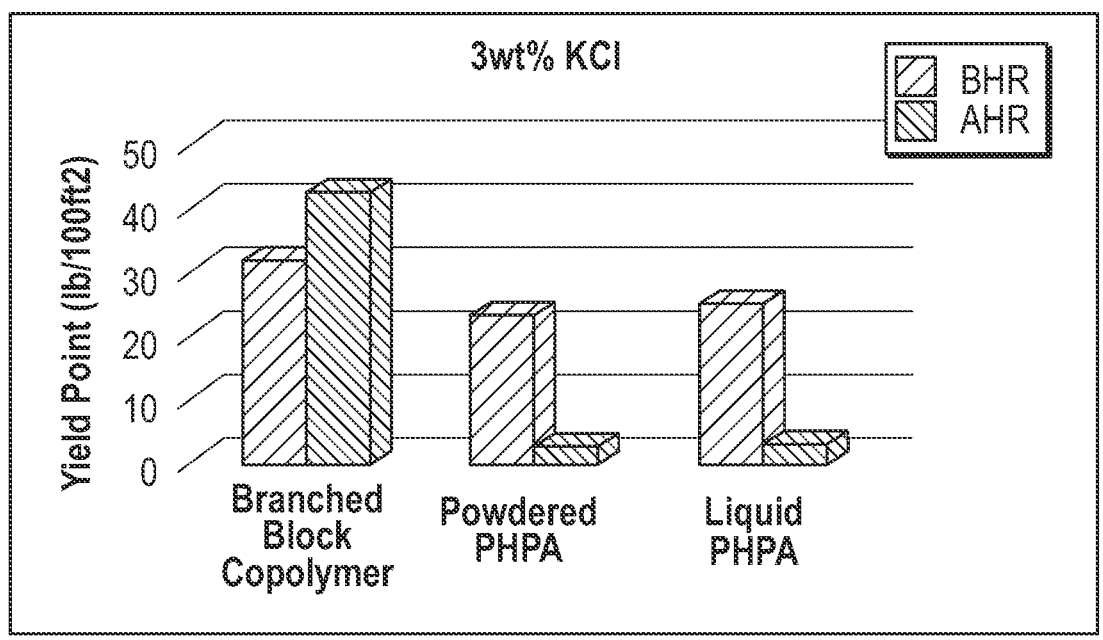

FIGS. 5A and 5B compare rheological properties of the UHMW branched block copolymer according to one or more embodiments disclosed herein with those of commercially available viscosifiers.

Figure 6:
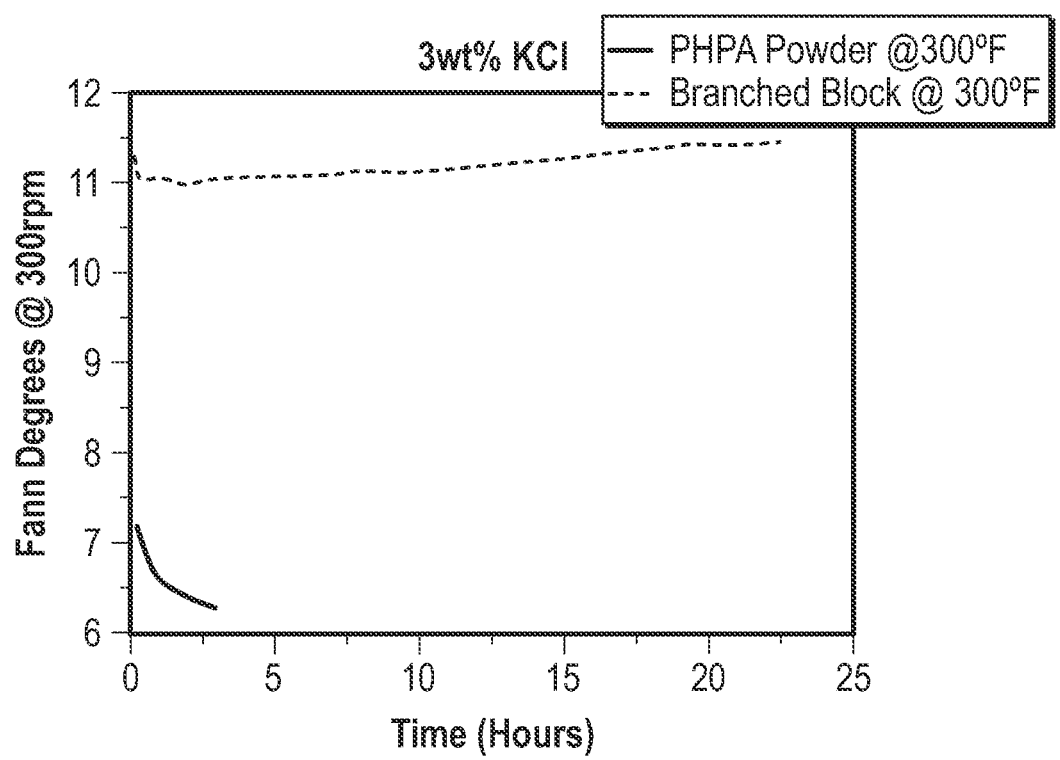

FIG. 6 compares rheological properties of the UHMW branched block copolymer according to one or more embodiments disclosed herein with those of commercially available viscosifiers.

Figure 7:
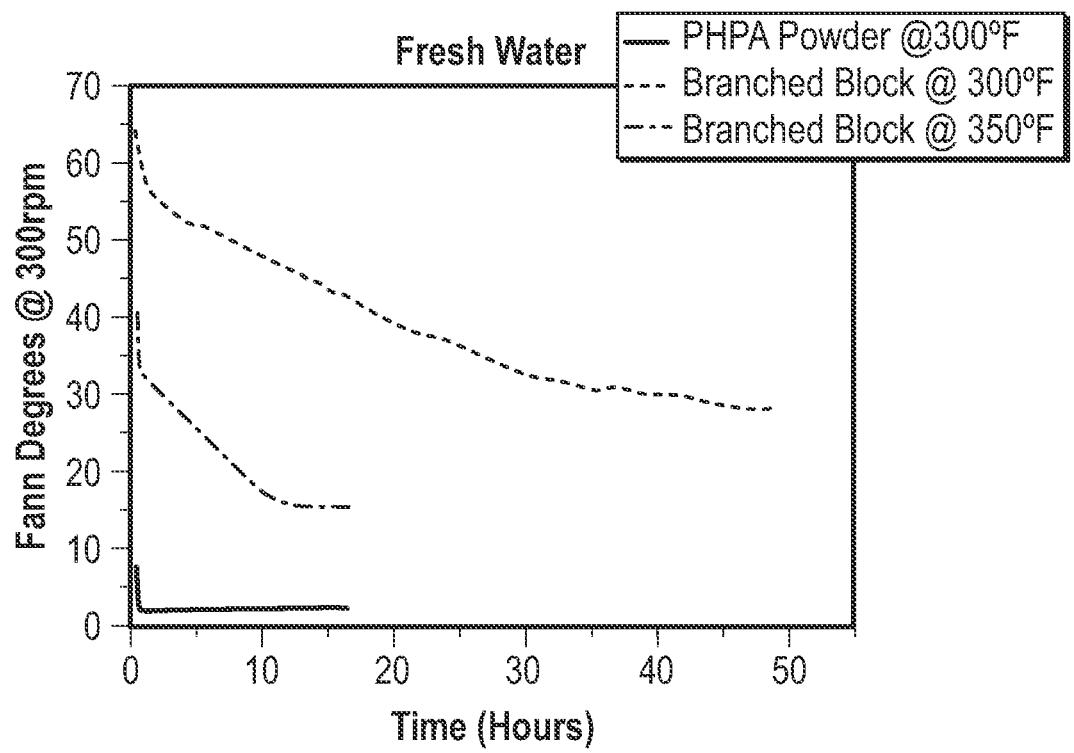

FIG. 7 illustrates rheological properties of the UHMW branched block copolymer according to one or more embodiments disclosed herein and commercial viscosifiers.

Figure 8A:
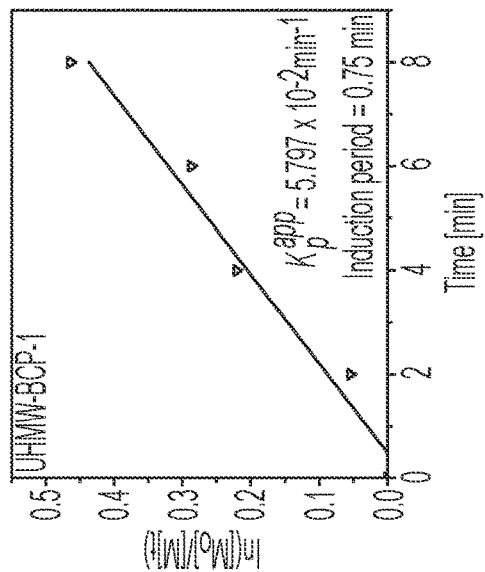

FIG. 8A graphically depicts $\ln([M_o]/[M]_t)$ vs. exposure time according to one or more embodiments disclosed herein.

Figure 8B:
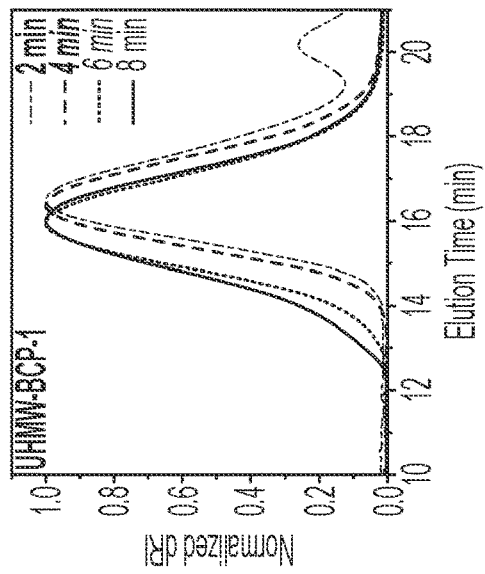

FIG. 8B graphically depicts differential refractive index (dRI) traces from SEC-MALS analysis according to one or more embodiments disclosed herein.

Figure 8C:
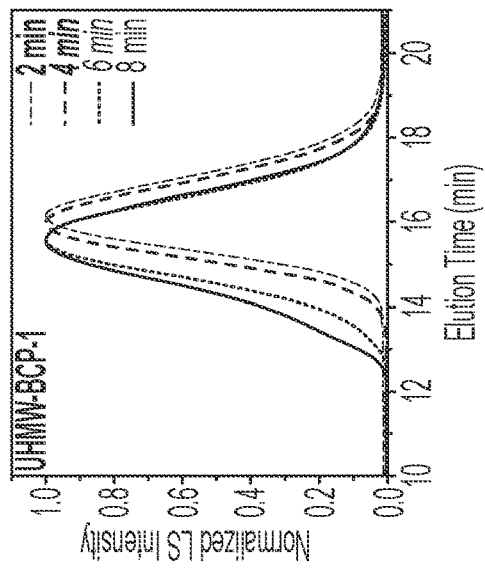

FIG. 8C graphically depicts light scattering (LS) traces for SEC-MALS analysis according to one or more embodiments disclosed herein.

Figure 9:
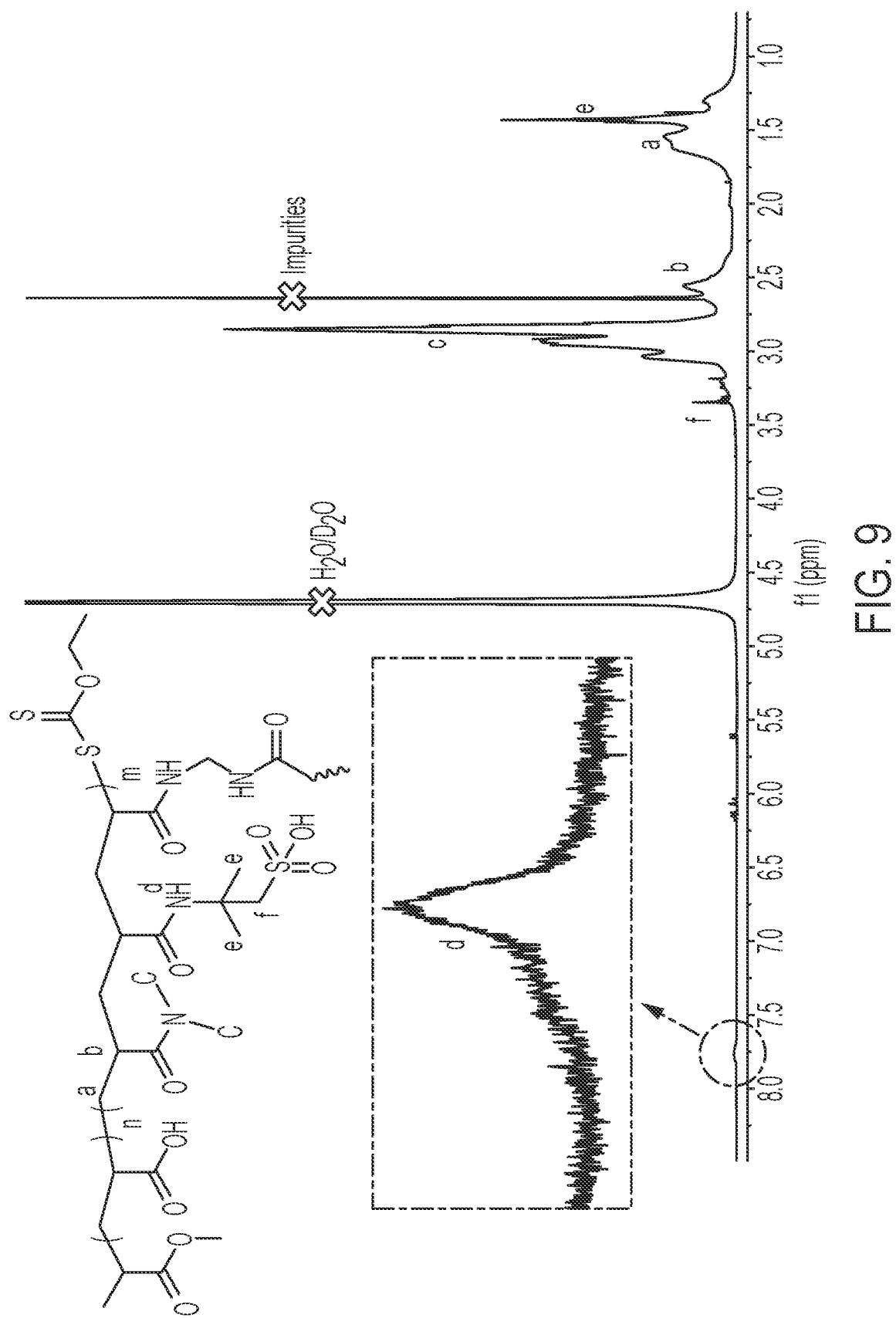

FIG. 9 graphically depicts 500 MHz 1H nuclear magnetic resonance (NMR) of the UHMW branched block copolymer according to one or more embodiments disclosed herein.

Figures 10A, 10B:
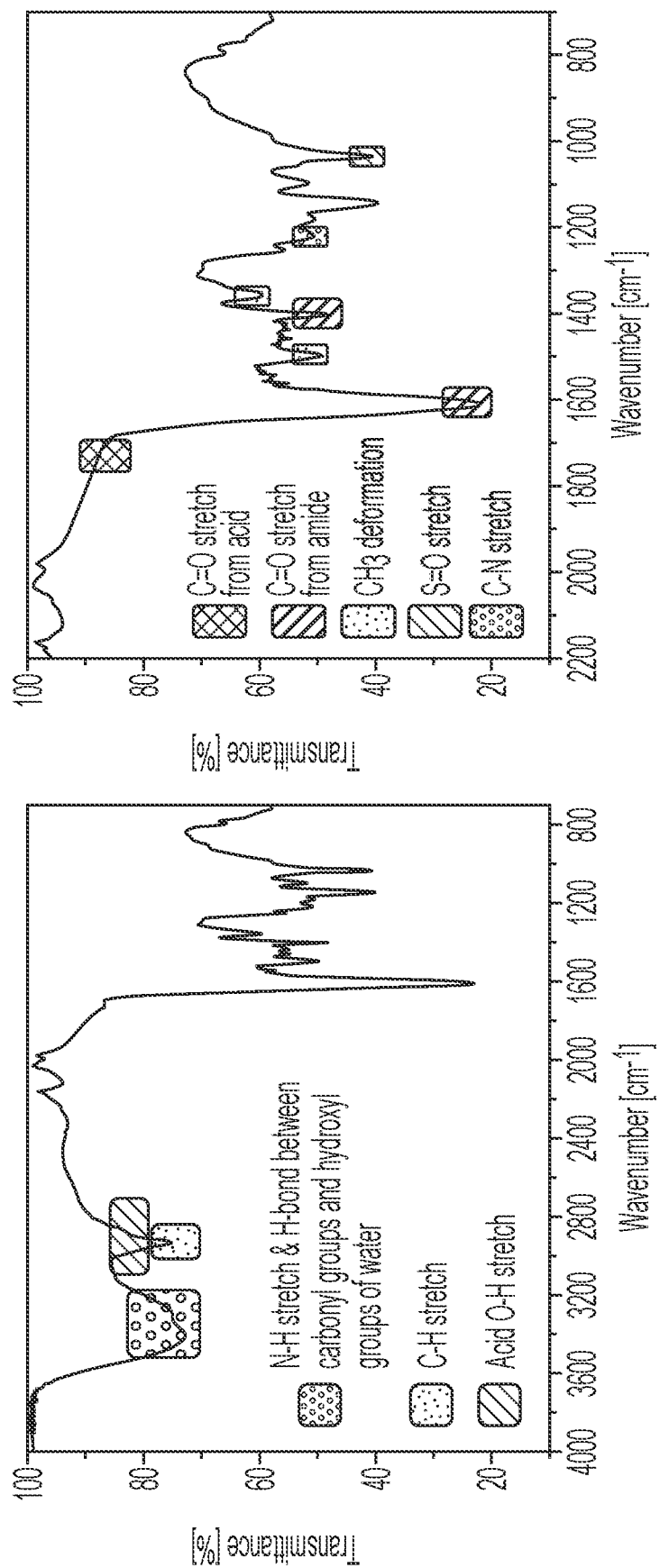

FIG. 10A graphically depicts FTIR spectra of the UHMW branched block copolymer according to one or more embodiments disclosed herein.

FIG. 10B graphically depicts FTIR spectra of the UHMW branched block copolymer according to one or more embodiments disclosed herein.

Figure 11:
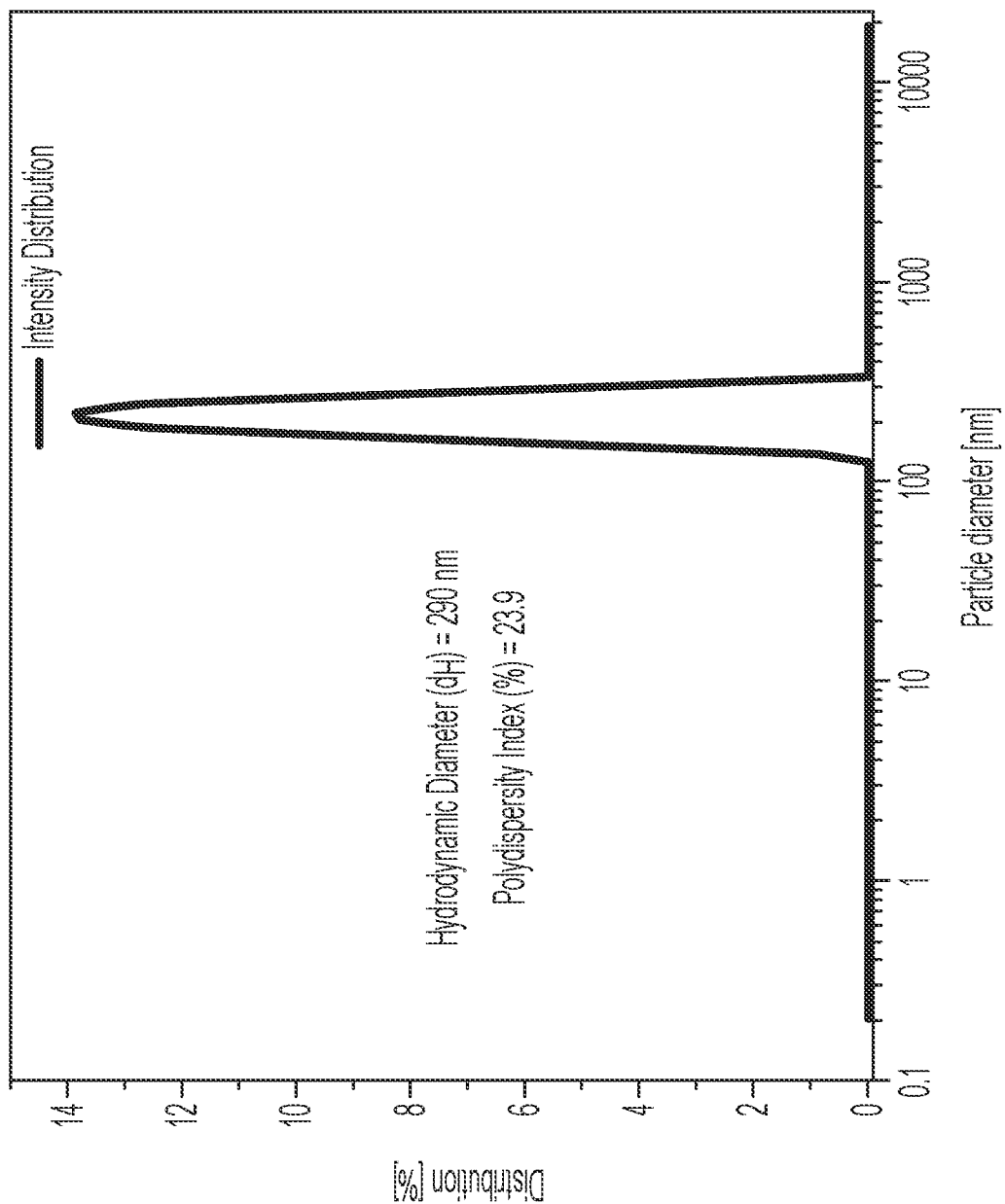

FIG. 11 graphically depicts DLS analysis of the UHMW branched block copolymer according to one or more embodiments disclosed herein.

Figure 12:
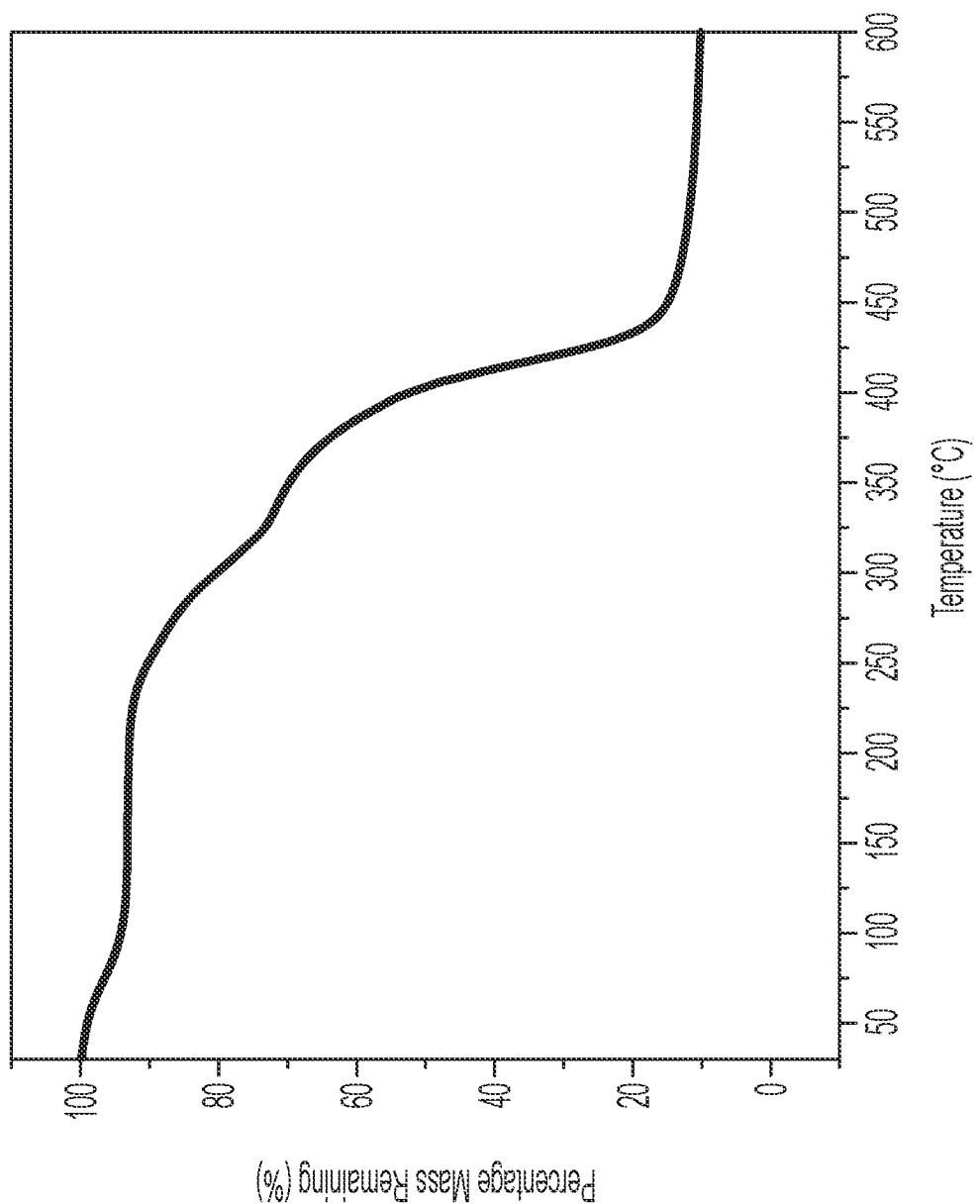

FIG. 12 graphically depicts thermogravimetric analysis (TGA) of the UHMW branched block copolymer according to one or more embodiments disclosed herein.

Figure 13:
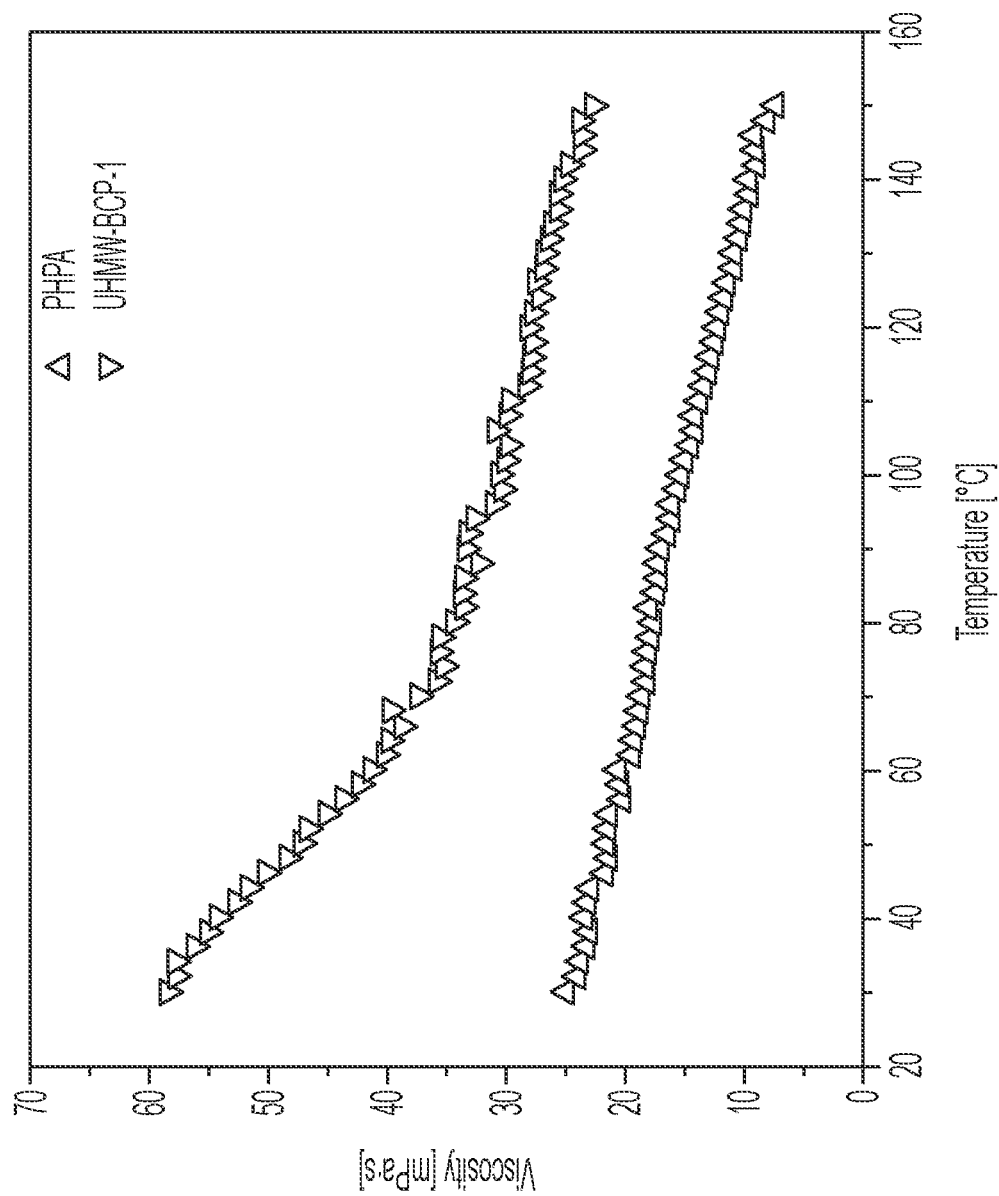

FIG. 13 graphically depicts viscosity measurements of the UHMW branched block copolymer according to one or more embodiments disclosed herein.

FIG. 14A graphically depicts polymer molecular weight profiles of the UHMW branched block copolymer according to one or more embodiments disclosed herein.

FIG. 14B graphically depicts polymer molecular weight profiles of a commercially available viscosifier.

Figure 15:
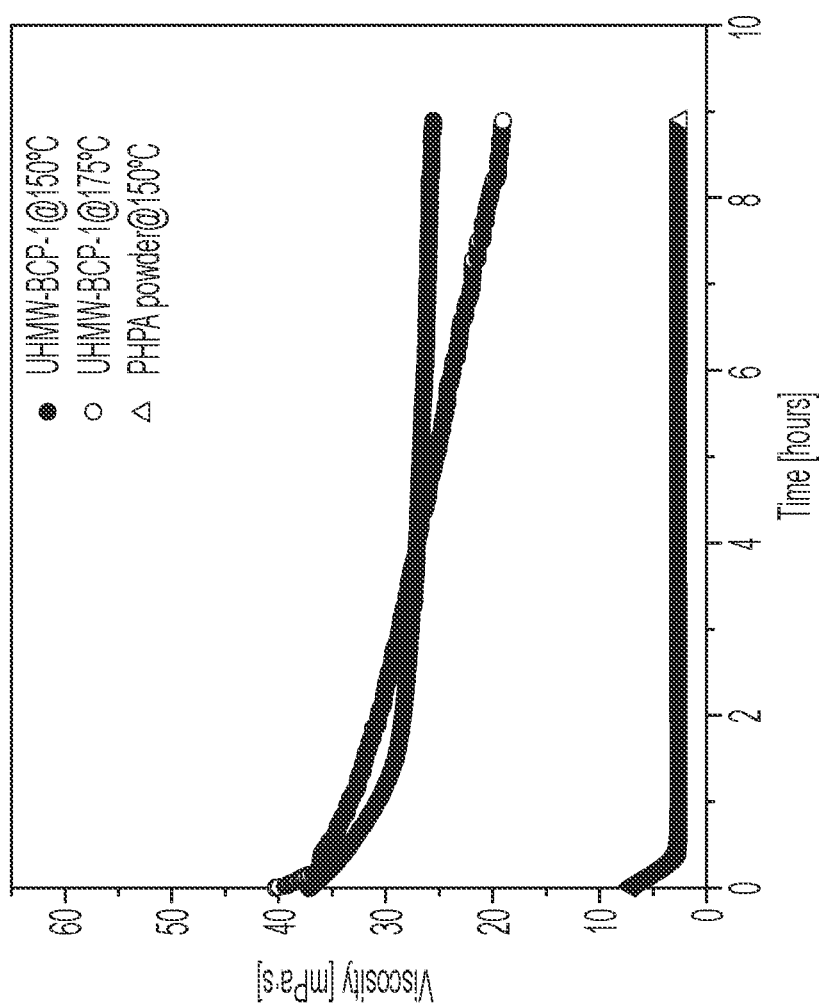

FIG. 15 graphically depicts viscosity measurements of the UHMW branched block copolymer according to one or more embodiments disclosed herein.

Figure 16B:
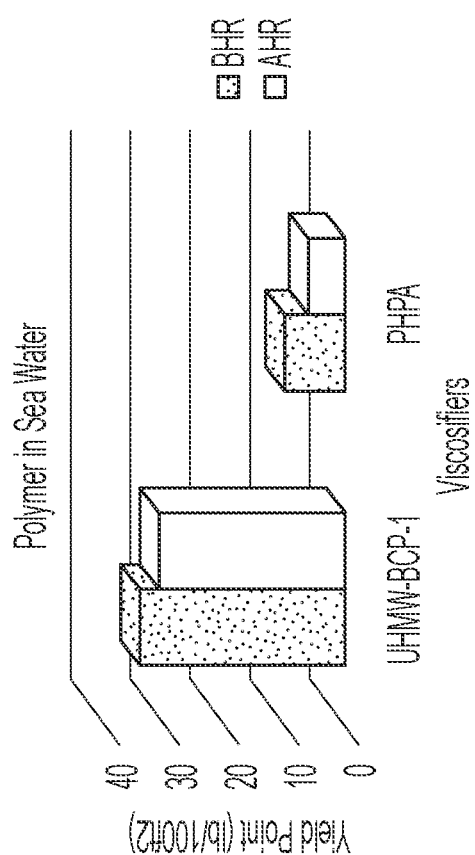
Figure 16A:
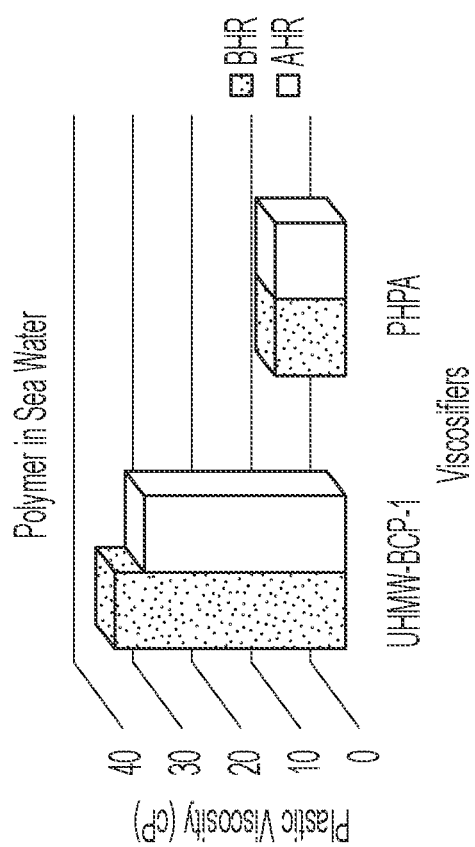

FIG. 16A graphically depicts viscosity measurements of the UHMW branched block copolymer according to one or more embodiments disclosed herein.

FIG. 16B graphically depicts viscosity measurements of the UHMW branched block copolymer according to one or more embodiments disclosed herein.

Figure 17B:
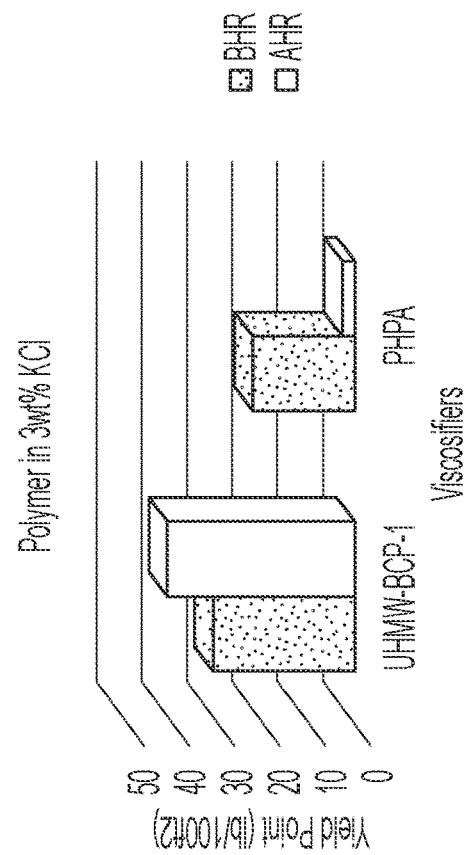
Figure 17A:
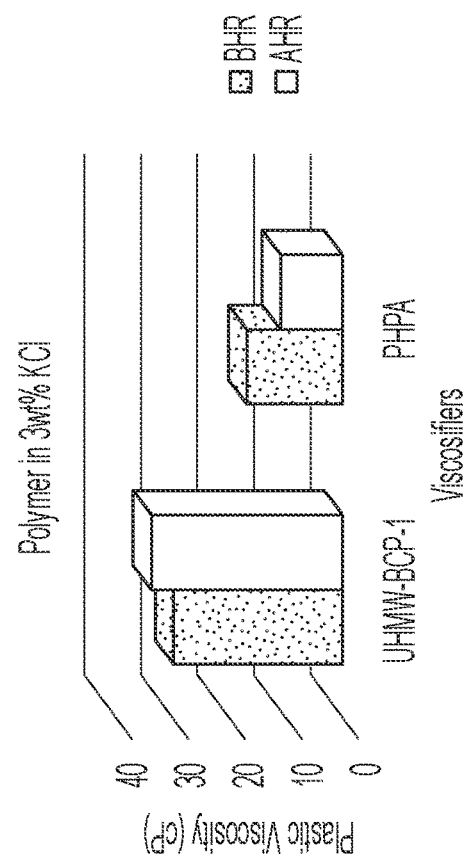

FIG. 17A graphically depicts viscosity measurements of the UHMW branched block copolymer according to one or more embodiments disclosed herein.

FIG. 17B graphically depicts viscosity measurements of the UHMW branched block copolymer according to one or more embodiments disclosed herein.

Figure 18:
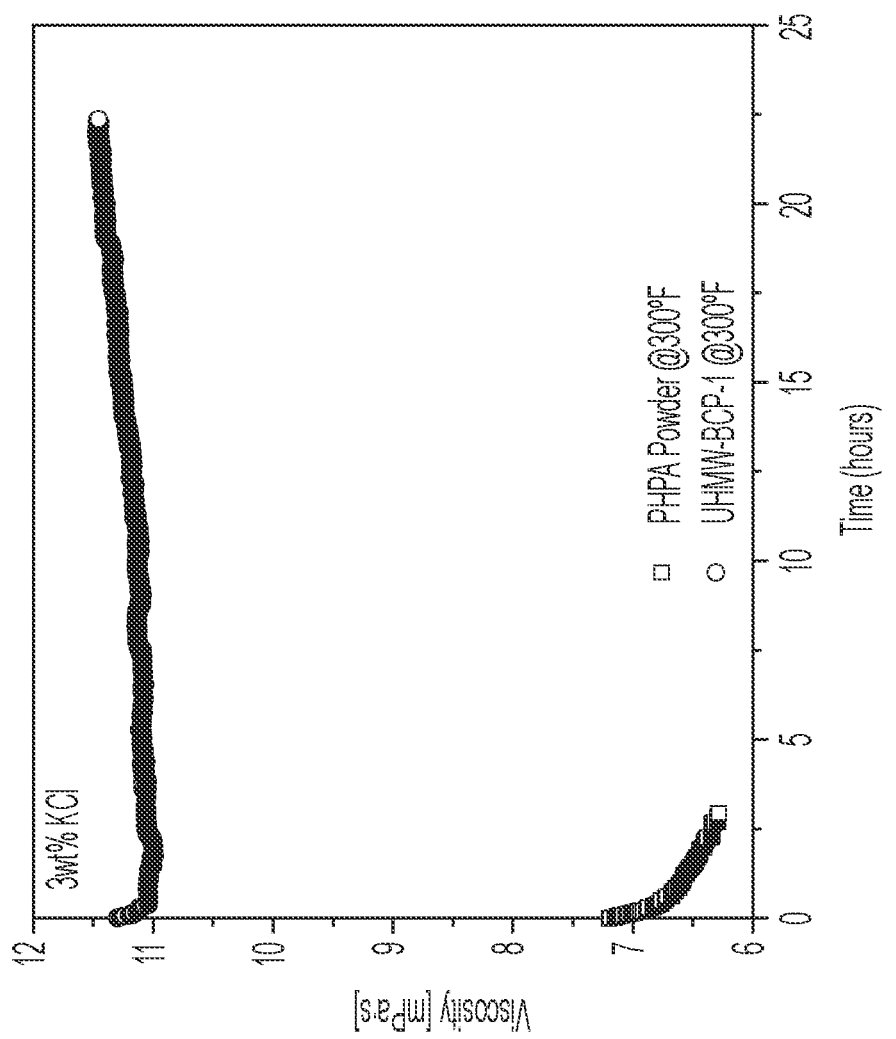

FIG. 18 graphically depicts viscosity measurements of the UHMW branched block copolymer according to one or more embodiments disclosed herein.

Figure 19:
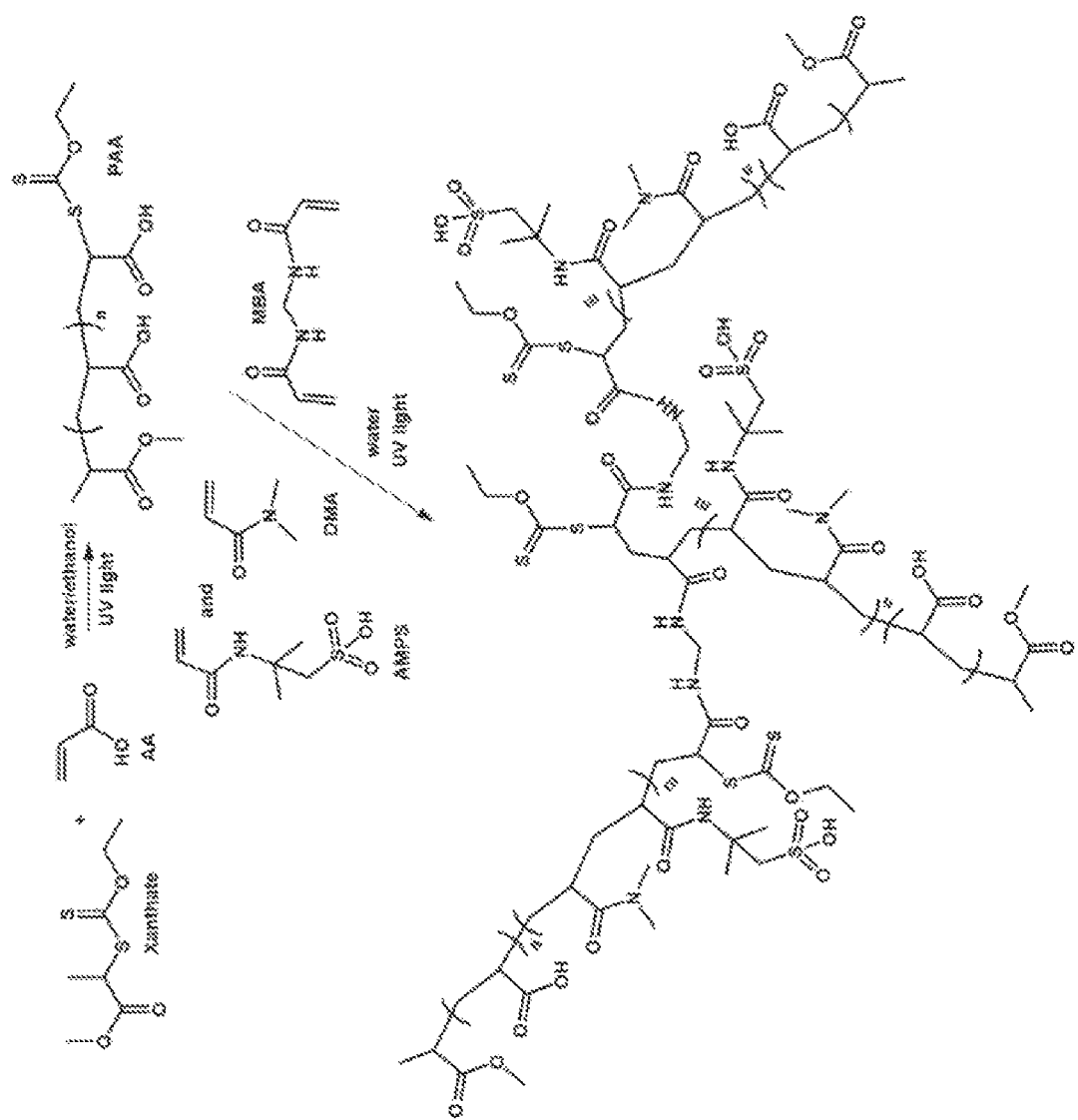

FIG. 19 schematically depicts a reaction diagram of the synthesis of the UHMW branched block copolymer according to one or more embodiments disclosed herein.

DETAILED DESCRIPTION

There are three stages of oil recovery from an oil reservoir which include primary, secondary, and tertiary recoveries. Primary oil recovery uses the natural energy of the reservoir to drive oil into the wellbore. There are six driving mechanisms that afford the reservoir with the natural energy. There mechanisms include rock and liquid expansion drive, gas cap drive, water drive, depletion drive, gravity drainage drive, and combination drive. Rock and fluid properties and reservoir heterogeneity often influence primary recovery. Upon depletion of the natural energy source, secondary recovery if often employed by providing external energy to boost production levels via re-pressurization of the reservoir by injecting water or gas. A significant amount of oil (40-60%) often remain trapped in the reservoir after primary and secondary recoveries. Therefore, tertiary recovery, also known as Enhanced Oil Recovery (EOR), helps to recover both capillary trapped residual Original Oil In Place (OOIP) and unswept/bypassed oils in the reservoir. Tertiary recovery involves injecting fluids into the reservoir that help to alter the viscous and capillary forces that hold the oil in place. Common EOR techniques include miscible gas injection (e.g. carbon dioxide, nitrogen, flue, and hydrocarbon gas), chemical flooding (alkali, polymer, and surfactant), thermal methods (steam flooding, hot water, and in-situ combustion), and others (microbial, acoustic, and low salinity/engineered water injection (LSWI)). Given the increasing global energy demand and decline in new discoveries in the past decades, EOR technology is crucial to increase oil recovery from aging fields.

Addition of water-soluble polymers to the injected water help to increase the viscosity of the injected water and decrease the mobility ratio between the displacing fluid (water) and the displaced fluid (oil). In other words, the effective permeability of water is reduced which leads to reduction of water fractional flow and increase in oil fractional flow. In addition, polymer flooding improves oil sweep efficiency and cumulative oil recovery by reducing viscous fingering and delaying breakthrough of the injected water.

Polymer flooding consists of injecting polymer-augmented water into a subterranean oil formation to improve the sweep efficiency in the reservoir. The increased viscosity of the water causes a better mobility control between the injected water and the hydrocarbons within the reservoir. Oil is left behind in a waterflood either because it is trapped by the capillary forces (residual oil) or because it is bypassed. The mobility ratio improvement associated with the use of polymers minimizes the bypassing effect.

$$\text{Mobility ratio}(M) = \frac{\lambda_{displacing\ fluid}}{\lambda_{displaced\ fluid}} = \frac{\frac{k_{rw}}{\mu_w}}{\frac{k_{ro}}{\mu_o}}$$

where $k_{rw}$ and $k_{ro}$ are the relative permeability of the displacing (water) and displaced (oil) fluid, respectively and $\mu_w$ and $\mu_o$ are viscosities of the displacing and displaced fluids, respectively. Polymer flooding is often implemented in two cases: when $M>1$ there may be unstable displacement and/or early breakthrough; and when $M<1$ there may be better sweep efficiency and/or reduced viscous fingering. When the mobility ratio during a waterflood is not favorable, continuous polymer injection can improve the sweep efficiency in the reservoir. Even with a favorable mobility ratio, if the reservoir has some degree of heterogeneity, polymer injection can help to reduce the water mobility in the high-permeability layers supporting the displacement of oil from the low-permeability layers.

In the first case where $M>1$, there is an inefficient macroscopic displacement that promotes early water breakthrough followed by a long period of two-phase production with increasing water-cuts. This situation can simply be illustrated by the viscous fingering concept which occurs especially in heavy oil reservoirs or when the mobility ratio $M$ is larger than 1 ($M>1$). Fractional flow calculations extensively described in the literature can be useful to visualize the benefits of polymer injection and compare simple cases.

The second case where $M<1$ is often overlooked. It appears that, even if the mobility ratio is equal or below 1, the presence of high-permeability channels or large-scale reservoir layering, and heterogeneities can greatly impair the areal and vertical sweep efficiencies during water injection. The presence of high-permeability layers will also lead to early water breakthrough, in these cases significant improvement can be gained using polymers to increase the viscosity of the injected water. This aspect should be remembered when screening the candidates for polymer injection to not overlook reservoirs that contain very light oils.

Polymer flooding has been part of the EOR technology for over 40 years with extensive laboratory and field applications. The use of polymer flooding has the potential of increasing oil recovery by 10-15% of OOIP. Although polymer flooding has the potential of increasing oil production than any other chemical EOR methods, the polymer performance is highly affected by reservoir heterogeneity, permeability, salinity, and temperature. Polymer flooding is mostly performed on sandstone reservoirs where temperature usually does not exceed 65° C. For sandstone and clayey reservoirs, which are negatively charged, the injection of anionic macromolecules is preferred to limit ionic interactions. This preference can also probably be explained by the fact that anionic polymers present several advantages: they have a high viscosifying power, very high molecular weights, and are cheap to produce by opposition to synthetic cationic polymers which are expensive to produce, highly shear sensitive, and display lower molecular weights on average.

There are currently two polymers that are used for EOR applications—synthetic polymers and biopolymers. Partially hydrolyzed polyacrylamide (PHPA) is one of the most extensively used synthetic polymer for EOR applications. PHPA is a flexible linear chain composed of copolymerization of acrylic acid and acrylamide monomers that expands in water. The thickening effect (viscosification) of PHPA is a function of molecular weight of the polymers and degree of hydrolysis (conversion of acrylamide to acrylic acid). A high molecular weight PHPA often results in a more viscous solution, but they have poor injectivity and lead to plugging of pore throats in porous media. In addition, PHPA polymers are very sensitive to temperature and salinity. PHPA polymers are stable up to 100° C. in the absence of divalent cations ($Ca^{2+}$ and $Mg^{2+}$) and at anaerobic conditions. At high temperature and salinity, the rate of hydrolysis is much greater which leads to compression and distortion of the polymer chains. Compared to biopolymers, PHPA polymers are less expensive and resistant to bacterial attack.

In response to the poor stability of PHPA, modification of PHPA polymers via addition of monomers such as 2-Acrylamido-2-methylpropane sulfonic acid (AMPS) or N-vinylpyrrolidone (NVP) help to increase the stability and robustness of the polymers at high temperature. Unlike acrylamide functionality in PHPA, addition of AMPS slows down hydrolysis. However, a greater protection is provided by NVP monomers where addition of these monomers helps to reduce hydrolysis up to 120° C. However, these NVP-based polymers are more expensive than commercial PHPA. The cost of the NVP-based polymer required to achieve the desired viscosity maybe uneconomic as NVP polymers tend to have a lower molecular weight.

Xanthan gum may be used as a biopolymer for EOR applications. The high molecular weight and rigid polymer chains of xanthan gum help provide polymers that are relatively insensitive to high salinity and hardness. Although xanthan gum has thermal stability that is close to PHPA, it is highly susceptible to bacterial degradation.

Scleroglucan is a better biopolymer substitute to xanthan gum. Scleroglucan is a non-ionic polysaccharide produced by the fermentation of a plant pathogen fungus. Scleroglucan is insensitive to salinity due to its non-ionic nature. It exists as semi-rigid rod-like triple helix molecules in aqueous solution. This structure results in its very high viscosifying power and resistance to mechanical degradation. This biopolymer is thermally stable up to 130° C. However, scleroglucan suffers from two major drawbacks. First, the concentrated broth, obtained through fermentation process by bacteria, contains debris (bacterial cells, proteins) and polymer aggregates also called microgels that must be removed for EOR applications in order to obtain a product with good filterability and no plugging tendency. Post-treatment such as heating, filtration and shearing improves the filterability. The second drawback is the poor resistance of scleroglucan to bacterial degradation.

As long-term polymer stability is often needed for polymer flooding, synthetic polymers are often better candidates over biopolymers as they are able to resist bacterial degradation. However, polymers classically used in EOR are copolymers of acrylamide (AM) and acrylic acid (AA)—often referred to as PHPA—suffer from chemical & thermal and mechanical stability issues. In terms chemical/thermal stability issues (thermal and chemical degradation), with increasing temperature, acrylamide moieties rapidly hydrolyze to acrylic acid moieities. These acid moieties can lead to the precipitation of the polymer and a substantial loss of viscosity because of the strong interaction of divalent cations such as $Ca^{2+}$ and $Mg^{2+}$ with negatively charged acrylic acid units. The rate of hydrolysis is often slow at temperatures below 50-60° C. with the temperature limit of PHPA in hard brines is about 60° C. Below this temperature, PHPA polymers are stable over extended periods of time.

Mechanical degradation can be understood as the break-up of polymer chains or rather molecules due to mechanical forces caused by the high shear stress. Usually these conditions are encountered in the near-wellbore region and in the equipment such as pumps and valves. The lower molecular weight of the polymer chains due to chain rupture decreases viscosity of the polymer solutions. Furthermore, the polymer chains break when they are stretched in an entanglement system. Mechanical stability issues are often encountered with linear synthetic polymers such as PHPA that undergo high shear rate near the wellbore region.

In addition, some polymers change their volume ratio or viscosities under different reservoir conditions. This leads to retention of the polymers in the rock which can lead to formation damage.

In one or more embodiments disclosed herein are new high performance, high temperature branched block copolymer viscosifiers that are both thermally and rheologically stable at high temperature. As used throughout this disclosure, the term "block copolymer" refers to a polymer having at least two compositionally distinct subunits (A and B) derived from different monomer species. The at least two compositionally distinct subunits are covalently bonded to one another and linearly oriented.

The branched architecture reduces retention of polymer in the rocks, and therefore, reduces formation damage. The performance of the branched block copolymer of the present disclosure is compared to a commercial PHPA from M-I Swaco under the commercial name Poly-Plus RD to establish its advantages The branched block copolymer of the present disclosure can provide stable viscosity profile at high shearing rates (511 $s^{-1}$ or 300 rpm) at temperatures up to 350° F./175° C. for long periods of time. In addition, better viscosification was also seen under saline conditions, which include sea water and KCl, with the branched block copolymer of the present disclosure when compared to commercial PHPA, which hints towards higher formation water salinity tolerance for the branched block copolymer of the present disclosure when compared to PHPA.

Such viscosifiers may be ultra-high molecular weight (UHMW) branched block copolymers for water based treatment fluids. Unlike current commercial synthetic and natural polymer products, the branched block copolymers according to embodiments herein may be able to achieve high temperature stability (≥300° F.) and may provide enhanced rheological properties at reduced polymer loadings.

An example treatment fluid composition may include from 0.01 wt. % to 5.0 wt. % viscosifier based on the total weight of the treatment fluid composition. In other embodiments, treatment fluid composition may optionally include from 0.01 wt. % to 4.5 wt. %, from 0.01 wt. % to 3.0 wt. %, from 0.01 wt. % to 1.0 wt. %, from 0.01 wt. % to 0.5 wt. %, from 0.05 wt. % to 5.0 wt. %, from 0.05 wt. % to 3.0 wt. %, from 0.05 wt. % to 1.0 wt. %, from 0.05 wt. % to 0.5 wt. %, from 0.1 wt. % to 3.0 wt. %, from 0.1 wt. % to 1.0 wt. %, from 0.1 wt. % to 0.3 wt. %, from 0.3 wt. % to 0.7 wt. %, from 0.3 wt. % to 0.5 wt. %, or from 0.5 wt. % to 0.7 wt. % viscosifier, based on the total weight of the treatment fluid composition. Unless otherwise stated, the weight percent of an additive in the treatment fluid composition is based on the total weight of the treatment fluid composition.

An example treatment fluid composition may include from 0.1 lbm/bbl to 25 lbm/bbl viscosifier based on the total volume of the treatment fluid composition. In other embodiments, the treatment fluid composition may include from 0.1 lbm/bbl to 20 lbm/bbl, from 0.1 lbm/bbl to 15 lbm/bbl, from 0.1 lbm/bbl to 10 lbm/bbl, from 0.1 lbm/bbl to 5 lbm/bbl, from 1 lbm/bbl to 25 lbm/bbl, from 1 lbm/bbl to 20 lbm/bbl, from 1 lbm/bbl to 15 lbm/bbl, from 1 lbm/bbl to 10 lbm/bbl, from 1 lbm/bbl to 5 lbm/bbl, from 5 lbm/bbl to 25 lbm/bbl, from 5 lbm/bbl to 20 lbm/bbl, from 5 lbm/bbl to 15 lbm/bbl, from 5 lbm/bbl to 10 lbm/bbl, from 10 lbm/bbl to 25 lbm/bbl, from 10 lbm/bbl to 20 lbm/bbl, from 10 lbm/bbl to 15 lbm/bbl, or from 15 lbm/bbl to 25 lbm/bbl viscosifier, based on the total volume of the treatment fluid composition. In some embodiments, the treatment fluid composition may include from 0.01 wt. % to 3 wt. % bentonite, based on the total weight of the treatment fluid composition.

The branched block copolymer may be a crosslinked, polymerized reaction product of crosslinker C and monomer A and monomer B. In embodiments, the branched block copolymer may optionally include monomer D.

The monomers A, B, and C have the structure:

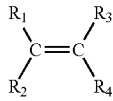

where $R_1$ and $R_2$ may include a halogen, H, CN, $CF_3$, straight or branched alkyl of from 1 to 20 carbon atoms, α,β-unsaturated straight or branched alkenyl or alkynyl of 2 to 10 carbon atoms, α,β-unsaturated straight or branched alkenyl of 2 to 6 carbon atoms substituted with a halogen, $C_3$-$C_8$ cycloalkyl, heterocyclyl C(=Y)$R_5$, C(=Y)$NR_6R_7$ and YC(=Y)$R_8$; where Y may be $NR_8$ or O; $R_5$ is alkyl of from 1 to 20 carbon atoms, alkoxy of from 1 to 20 carbon atoms, aryloxy or heterocyclyloxy; $R_6$ and $R_7$ are independently H or alkyl of from 1 to 20 carbon atoms, or $R_6$ and $R_7$ may be joined together to form an alkylene group of from 2 to 5 carbon atoms, thus forming a 3- to 6-membered ring; and $R_8$ is H, straight or branched $C_1$-$C_{20}$ alkyl or aryl; and $R_3$ and $R_4$ are independently selected from the group consisting of a halogen, H, $C_1$-$C_6$ alkyl and $COOR_9$, where $R_9$ is an alkali metal, H, or a $C_1$-$C_6$ alkyl group; or $R_1$ and $R_3$ may be joined to form a group of the formula $(CH_2)_n$, may be substituted with from 1 to 2n halogen atoms or $C_1$-$C_4$ alkyl groups, and Y is as defined above; and at least two of $R_1$, $R_2$, $R_3$, and $R_4$ are a halogen or H.

Monomer A may include acrylic acid (AA), 2 acrylamido 2 methylpropane sulfonic acid (AMPS), 2 acrylamido ethyl phosphonic acid (AEPA), maleic acid, N,N dimethylacrylamide, (3 acrylamidopropyl)trimethylammonium chloride, 2 hydroxyethyl acrylate, styrene 4 sulfonic acid sodium salt, poly(ethylene glycol) methyl ether acrylate, lauryl acrylate, or combinations thereof. In embodiments, monomer A may include AMPS, AEPA, acrylic acid, maleic acid, or combinations thereof. In embodiments, monomer A may include acrylic acid. The branched block copolymer may include from 5 to 75 wt. %, from 5 to 70 wt. %, from 5 to 60 wt. %, from 5 to 50 wt. %, from 5 to 40 wt. %, from 5 to 30 wt. %, from 5 to 20 wt. %, from 5 to 10 wt. %, from 10 to 75 wt. %, from 10 to 70 wt. %, from 10 to 60 wt. %, from 10 to 50 wt. %, from 10 to 40 wt. %, from 10 to 30 wt. %, from 10 to 20 wt. %, from 20 to 75 wt. %, from 20 to 70 wt. %, from 20 to 60 wt. %, from 20 to 50 wt. %, from 20 to 40 wt. %, from 20 to 30 wt. %, from 30 to 75 wt. %, from 30 to 70 wt. %, from 30 to 60 wt. %, from 30 to 50 wt. %, from 30 to 40 wt. %, from 40 to 75 wt. %, from 40 to 70 wt. %, from 40 to 60 wt. %, from 40 to 50 wt. %, from 50 to 75 wt. %, from 50 to 70 wt. %, from 50 to 60 wt. %, from 60 to 75 wt. %, from 60 to 70 wt. %, or from 70 to 75 wt. % monomer A by weight of the branched block copolymer.

Monomer A may include an anionic, monomer including (meth)acrylate monomer units carrying a COOH or COO— group, such as acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid, or monoethylenically unsaturated $C_4$-$C_{10}$ (for example, $C_4$ to $C_6$) dicarboxylic acid monoesters (such as monomethyl maleate); monomer ((meth)acrylate/(meth)acrylamide) units carrying phosphate, phosphonate or phosphinate groups (in the free acid form and/or in the saline form), such as 2-acrylamido-ethylphosphonic acid (AEPA), monoacryloyloxyethyl phosphate or bis(2-methacryloyloxyethyl) phosphate units, vinylphosphonic acid, allylphosphonic acid, isopropylphosphonic acid, or diallyl aminomethylene phosphonate and their salts; or monomer units comprising a sulfonic acid or sulfonate functional group such as 3-sulfopropyl (meth)acrylate, 2-propene-1-sulfonic acid, sodium 1-allyloxy-2 hydroxypropyl sulfonate (COPS1), 2-acrylamido-2-methylpropanesulfonic acid (AMPS), (meth)allyl sulfonate, sodium vinylsulfonate, or sodium styrenesulfonate.

Monomer A may include a nonionic, monomer including monomer units comprising an acrylamide, N,N-(Dimethyl acrylamide) (DMA), (meth)acrylamide, morpholine N-oxide acrylamide, N,N-dimethyl(meth)acrylamide, N,N-diethylacrylamide, (meth) acrylamide, N-isopropyl (meth) acrylamide, N-tert-butyl(meth)acrylamide, or diacetone acrylamide; or (meth)acrylate monomers with ammonium groups, including N,N-dimethylaminomethyl (meth) acrylate, N,N-dimethylaminoethyl (meth) acrylate, N,N-diethylaminoethyl (meth)acrylate, N,N-dimethylaminopropyl (meth)acrylate, N,N-diethylaminopropyl (meth)acrylate and N,N-dimethylaminocyclohexyl (meth)acrylate, meth(acrylamide) monomers with ammonium groups, including N-[2-(dimethylamino) ethyl](meth)acryl amide, N-[3-(dimethylamino) methyamino) propyl] (meth)acrylamide, N-[4-(dimethylamino) butyl] (meth)acrylamide, N-[2-(diethylamino) ethyl] (meth)acryl amide, and N-[4-(dimethyl amino) cyclohexyl] (meth)acrylamide, [2-((Meth) acryloyloxy)ethyl]trimethylammonium chloride, and zwitterionic monomers such as N-(3-Sulfopropyl)-N-(meth)acroyloxyethyl-N,N-dimethylammonium betaine, N-(3-sulfopropyl)-N-methacroylamidepropyl-N,N-dimethylammonium betaine, N-(3-carboxymethyl)-N-methacroylamidepropyl-N,N-dimethylammonium betaine, and N-carboxymethyl-N-methacroyloxyethy-N,N dimethyl-ammonium betaine. Meth(acrylate) and meth(acrylamide) with alkane diols with $C_2$-$C_{30}$ or polyethylene glycol, such as 2-hydroxyethyl (meth)acrylate, 2-hydroxypropyl (meth)

acrylate, 3-hydroxypropyl (meth)acrylate, 3-hydroxybutyl (meth)acrylate, 4-hydroxybutyl (meth)acrylate, 6-hydroxy hexyl (meth)acrylate, 3-hydroxy-2-ethylhexyl (meth)acrylate, N-(hydroxymethyl) acrylamide, N-(2-hydroxypropyl) methacrylamide, N-hydroxyethylacrylamide, N-[tris (hydroxymethyl) methacrylamide, 4-acryloylmorpholine, 2-N-morpholinoethyl methacrylate, (meth) acrylate of polyethylene glycol, (meth) acrylate of diethylene glycol, ethylene glycol methyl ether (meth) acrylate, poly (propylene glycol) acrylate, 2-chloroethyl (meth)acrylate, tetrahydrofurfuryl acrylate, vinyl acetamide, vinyl pyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, or N-vinyl-7-ethyl-2-caprolactam.

Monomer B may include acrylic acid, 2 acrylamido 2 methylpropane sulfonic acid, 2 acrylamido ethyl phosphonic acid, maleic acid, N,N dimethylacrylamide, (3 acrylamidopropyl)trimethylammonium chloride, 2 hydroxyethyl acrylate, styrene 4 sulfonic acid sodium salt, poly(ethylene glycol) methyl ether acrylate, lauryl acrylate, or combinations thereof.

Monomer B may include an anionic, monomer including (meth)acrylate monomer units carrying a COOH or COO— group, such as acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid, or monoethylenically unsaturated $C_4$-$C_{10}$ (for example, $C_4$ to $C_6$) dicarboxylic acid monoesters (such as monomethyl maleate); monomer ((meth)acrylate/(meth)acrylamide) units carrying phosphate, phosphonate or phosphinate groups (in the free acid form and/or in the saline form), such as 2-acrylamido-ethylphosphonic acid (AEPA), monoacryloyloxyethyl phosphate or bis(2-methacryloyloxyethyl) phosphate units, vinylphosphonic acid, allylphosphonic acid, isopropylphosphonic acid, or diallyl aminomethylene phosphonate and their salts; or monomer units comprising a sulfonic acid or sulfonate functional group such as 3-sulfopropyl (meth)acrylate, 2-propene-1-sulfonic acid, sodium 1-allyloxy-2 hydroxypropyl sulfonate (COPS1), 2-acrylamido-2-methyl propanesulfonic acid (AMPS), (meth)allyl sulfonate, sodium vinylsulfonate, or sodium styrenesulfonate.

Monomer B may include a nonionic, monomer including monomer units comprising an acrylamide, N,N-(Dimethyl acrylamide) (DMA), (meth)acrylamide, morpholine N-oxide acrylamide, N,N-dimethyl(meth)acrylamide, N,N-diethylacrylamide, (meth) acrylamide, N-isopropyl (meth) acrylamide, N-tert-butyl(meth)acrylamide, or diacetone acrylamide; (meth)acrylate monomers with ammonium groups, including N,N-dimethylaminomethyl (meth) acrylate, N,N-dimethylaminoethyl (meth) acrylate, N,N-diethylaminoethyl (meth)acrylate, N,N-dimethylaminopropyl (meth)acrylate, N,N-diethylaminopropyl (meth)acrylate and N,N-dimethylaminocyclohexyl (meth)acrylate, meth(acrylamide) monomers with ammonium groups, including N-[2-(dimethylamino) ethyl] (meth)acryl amide, N-[3-(dimethylamino) methylamino) propyl] (meth)acrylamide, N-[4-(dimethylamino) butyl] (meth)acrylamide, N-[2-(diethylamino) ethyl] (meth)acrylamide, and N-[4-(dimethylamino) cyclohexyl] (meth)acrylamide, [2-((Meth) acryloyloxy)ethyl]trimethylammonium chloride, and zwitterionic monomers such as N-(3-Sulfopropyl)-N-(meth)acroyloxyethyl-N,N-dimethylammonium betaine, N-(3-sulfopropyl)-N-methacroylamidepropyl-N,N-dimethyl ammonium betaine, N-(3-carboxymethyl)-N-methacroylamidepropyl-N,N-dimethyl ammonium betaine, and N-carboxymethyl-N-methacroyloxyethyl-N,N dimethylammonium betaine. Meth(acrylate) and meth(acrylamide) with alkane diols with $C_2$-$C_{30}$ or polyethylene glycol, such as 2-hydroxyethyl (meth)acrylate, 2-hydroxypropyl (meth) acrylate, 3-hydroxypropyl (meth)acrylate, 3-hydroxybutyl (meth)acrylate, 4-hydroxybutyl (meth)acrylate, 6-hydroxy hexyl (meth)acrylate, 3-hydroxy-2-ethylhexyl (meth)acrylate, N-(hydroxymethyl) acrylamide, N-(2-hydroxypropyl) methacrylamide, N-hydroxyethylacrylamide, N-[tris (hydroxymethyl) methacrylamide, 4-acryloylmorpholine, 2-N-morpholinoethyl methacrylate, (meth) acrylate of polyethylene glycol, (meth) acrylate of diethylene glycol, ethylene glycol methyl ether (meth) acrylate, poly (propylene glycol) acrylate, 2-chloroethyl (meth)acrylate, tetrahydrofurfuryl acrylate, vinyl acetamide, vinyl pyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, or N-vinyl-7-ethyl-2-caprolactam.

In embodiments, monomer B may include a monomer including a alkyl (meth)acrylate monomer such as $C_2$-$C_{40}$ alkyl esters of acrylic acid and $C_1$-$C_{40}$ alkyl esters of methacrylic acid, vinyl aromatics, and fluorinated alkyl (meth)acrylates. Monomer B may include alkyl (meth)acrylate monomer units with $C_1$-$C_{20}$ alkyl chains such as monomers, can include, without limitation $C_2$-$C_{40}$ alkyl esters of acrylic acid and $C_1$-$C_{40}$ alkyl esters of methacrylic acid (for example methyl (meth)acrylate, ethyl (meth)acrylate, N-propyl (meth)acrylate, isopropyl (meth)acrylate, N-butyl (meth)acrylate, isobutyl (meth)acrylate, tert-butyl (meth) acrylate, pentyl (meth)acrylate, N-hexyl (meth)acrylate, N-heptyl (meth)acrylate, N-octyl (meth)acrylate, 2-ethylhexyl (meth)acrylate, decyl (meth)acrylate, lauryl (meth) acrylate, palmityl (meth)acrylate, stearyl (meth)acrylate, hydrenol (meth)acrylate, behenyl (meth)acrylate, polyisobutene (meth)acrylate, or phenoxyethyl (meth)acrylate), vinyl aromatic units including styrene, phenyl (meth)acrylate, benzyl (meth) acrylate)4-acetoxystyrene, 4-bromostyrene, 2,4-dimethylstyrene, 2,5-dimethylstyrene, 3,5-dimethylstyrene, 4-ethoxystyrene, 4-tert-butystyrene, 2-chlorostyrene, 3-chlorostyrene, 4-chlorostyrene, 4-ethoxystyrene, 4-fluorostyrene, 2,6-dichlorostyrene, 4-methoxystyrene, methylstyrene, 3-methylstyrene, 4-methylstyrene, 2,4,6-trimethylstyrene, or acrylate/methacrylate monomer units with fluorinated functionality.

In embodiments, monomer B may include an alkyl acrylate having the structure shown below.

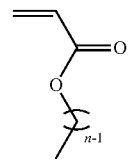

In embodiments, n may range from 5 to 20, from 5 to 17, from 5 to 15, from 5 to 14, from 5 to 12, from 5 to 10, from 5 to 8, from 5 to 7, from 7 to 20, from 7 to 17, from 7 to 15, from 7 to 14, from 7 to 12, from 7 to 10, from 7 to 8, from 8 to 20, from 8 to 17, from 8 to 15, from 8 to 14, from 8 to 12, from 8 to 10, from 10 to 20, from 10 to 17, from 10 to 15, from 10 to 14, from 10 to 12, from 12 to 20, from 12 to 17, from 12 to 15, from 12 to 14, from 14 to 20, from 14 to 17, from 15 to 20, from 15 to 17, or from 17 to 20.

The branched block copolymer may include from 15 to 50 wt. %, from 15 to 45 wt. %, from 15 to 40 wt. %, from 15 to 35 wt. %, from 15 to 30 wt. %, from 15 to 25 wt. %, from 15 to 20 wt. %, from 20 to 50 wt. %, from 20 to 45 wt. %, from 20 to 40 wt. %, from 20 to 35 wt. %, from 20 to 30 wt. %, from 20 to 25 wt. %, from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 40 wt. %, from 30 to 35 wt. %, from 35 to 50 wt. %, from 35 to 45 wt. %, from 35 to 40 wt. %, from 40 to 50 wt. %, from 40 to 45 wt. %, or from 45 to 50 wt. % monomer B by weight of the branched block copolymer.

Monomer D may include any of the monomers described above for either Monomer A or Monomer B.

As stated previously, there are embodiments in which monomer D is not included. In embodiments where monomer D is included, the branched block copolymer may include from 15 to 50 wt. %, from 15 to 45 wt. %, from 15 to 40 wt. %, from 15 to 35 wt. %, from 15 to 30 wt. %, from 15 to 25 wt. %, from 15 to 20 wt. %, from 20 to 50 wt. %, from 20 to 45 wt. %, from 20 to 40 wt. %, from 20 to 35 wt. %, from 20 to 30 wt. %, from 20 to 25 wt. %, from 25 to 50 wt. %, from 25 to 45 wt. %, from 25 to 40 wt. %, from 25 to 35 wt. %, from 25 to 30 wt. %, from 30 to 50 wt. %, from 30 to 45 wt. %, from 30 to 40 wt. %, from 30 to 35 wt. %, from 35 to 50 wt. %, from 35 to 45 wt. %, from 35 to 40 wt. %, from 40 to 50 wt. %, from 40 to 45 wt. %, or from 45 to 50 wt. % monomer D by weight of the branched block copolymer.

The crosslinker C may include vinyl aromatics, (meth) acrylate crosslinkers, (meth)acrylamide crosslinkers, or combinations thereof. The crosslinker C may include N,N methylenebisacrylamide, bis(2-methacryloyl)oxyethyl disulfide, 1,4-bis(4-vinylphenoxy)butane, divinyl benzene, ethylene glycol di(meth)acrylate, diethylene glycol di(meth) acrylate, tetra(ethylene glycol) diacrylate, triethylene glycol dimethacrylate, poly(ethylene glycol) di(meth)acrylate, neopentyl glycol diacrylate, neopentyl glycol propoxylate diacrylate, tri(propylene glycol) diacrylate, or combinations thereof. In embodiments, crosslinker C may include N,N methylene bis(acrylamide). The branched block copolymer may include from 15 to 30 wt. %, from 15 to 25 wt. %, from 15 to 20 wt. %, from 20 to 30 wt. % h, from 20 to 25 wt. %, or from 25 to 30 wt. % crosslinker C by weight of the branched block copolymer.

The polymerized reaction product may include a plurality of block copolymer segments of monomer A and monomer B interconnected via crosslinker C. In other embodiments, the polymerized reaction product may include a plurality of block copolymer segments of monomer A, monomer B, and monomer D interconnected via crosslinker C. In yet another embodiment, the polymerized reaction product may include both a plurality of block copolymer segments of monomer A and monomer B interconnected via crosslinker C and a plurality of block copolymer segments of monomer A, monomer B, and monomer D interconnected via crosslinker C.

In embodiments, the branched block copolymer may have the structure shown below:

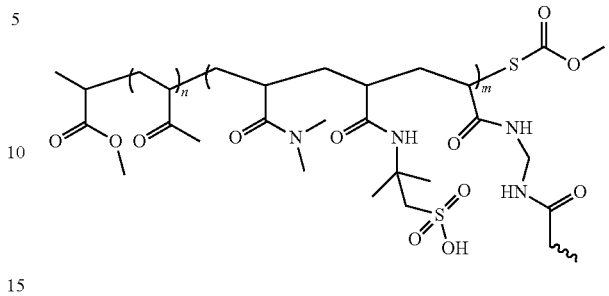

where n ranges from 2 to 1000 and m ranges from 2 to 30000.

In embodiments, the branched block copolymer may be $PAA_x$-block-$(PDMA_y$-stat-$PAMPS_z$-stat-$PMBA_w)$, where x ranges from 2 to 100, y ranges from 2 to 50000, z ranges from 2 to 5000, and w ranges from 1 to 50.

The synthesis of the branched block copolymer may include reversible addition-fragmentation chain transfer (RAFT) polymerization. RAFT polymerization requires the use of (I) initiators, (II) RAFT agents, and (III) monomers (for instance the monomers A, B C, and D previously described).

The UHMW branched block copolymer disclosed herein may be produced by a UV initiated photoiniferter approach for synthesis of polymers. This photoiniferter approach is a slight variation of a typical photopolymerization approach as it may afford two important features to polymer/viscosifier synthesis. First, unlike typical photopolymerization or thermal polymerization processes for viscosifier synthesis, the photoiniferter approach may not require the use of initiators to initiate the polymerization. Second, the absence of initiators may afford the growth of ultra-long chains which produce ultra-high molecular weight polymers. Such polymers may be branch-blocked, random-blocked, di-blocked, random-di-blocked, random-branch-blocked, etc. The synthesis may be carried out in one vessel with environmentally friendly solvents such as water and alcohols (such as ethanol, isopropanol, etc.).

The UHMW branched block copolymer may be composed of water soluble monomers with charged and uncharged functionalities with molecular weights ranging from several thousand to several million g/mol.

The UHMW polymer may be synthesized under controlled, or "living" radical polymerization technique, such as Reversible Addition-Fragmentation chain Transfer polymerization (RAFT). In addition, it may be possible to achieve molecular weights up to millions of Dalton (g/mol) using a photoiniferter approach via UV polymerization in combination with RAFT polymerization. In such an approach, a short chain of polyacrylic acid having a chain length of 5-500 units, for example, may be initially synthesized in a first step under a mild UV irradiation in a solvent, such as in water/ethanol mixture over a reaction time of about 10-60 minutes, for example. Upon reaching near complete monomer conversions (~97%), additional water and DMA, AMPS, and MBA monomers may be added. Irradiation under the same UV source may be carried out for a reaction time, which may be about 30 minutes to 120 minutes, for example, to achieve near complete monomer conversions. The overall synthesis of the branched block copolymer may therefore be accomplished in a one pot, two step approach with near quantitative yields (>95%). The overall synthesis may be carried out via a green approach where UV light and green solvents, such as ethanol and water, are employed. The final product may then be directly applied into treatment fluid formulations without any need for polymer purification.

For such polymerization techniques, the general structure of a RAFT agent is:

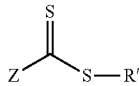

where Z may be a hydrogen atom, a chlorine atom, a sulfur atom, an oxygen atom, an optionally substituted alkyl or optionally substituted aryl radical, an optionally substituted heterocycle, an optionally substituted alkylthio radical, an optionally substituted arylthio radical, an optionally substituted alkylselenium radical, an optionally substituted arylselenium radical, an optionally substituted alkoxy radical, an optionally substituted aryloxy radical, an optionally substituted amino radical, an optionally substituted hydrazine radical, an optionally substituted alkoxycarbonyl radical, an optionally substituted aryloxycarbonyl radical, an optionally substituted acycloxy or carboxyl radical, an optionally substituted aroyloxy radical, an optionally substituted carbamoyl radical, a cyano radical, a dialkyl- or diarylphosphonato radical, a dialkyl-phosphinato or diaryl-phosphinato radical, or a polymer chain; and R' may be an optionally substituted alkyl, an optionally substituted acyl, an optionally substituted aryl, an optionally substituted aralkyl, an optionally substituted alkenyl or an optionally substituted alkynyl group; a saturated or unsaturated aromatic, an optionally substituted carbocycle or an optionally substituted heterocycle or a polymer chain, where the polymer chain may be.

The R' or Z groups, when they are substituted, can be substituted by optionally substituted phenyl groups, optionally substituted aromatic groups, saturated or unsaturated carbocycles, saturated or unsaturated heterocycles, or one or more selected from the group consisting of alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, perfluoroalkyl C$_n$F$_{2n+1}$, allyl, epoxy, alkoxy (—OR), S-alkyl, S-aryl, Se-alkyl, Se-aryl groups exhibiting a or ionic nature, such as alkali metal salts of carboxylic acids, alkali metal salts of sulfonic acids, polyalkylene oxide (PEO, PPO) chains, and cationic substituents (quaternary ammonium salts), where R may be an alkyl or aryl group, or a polymer chain.

The RAFT agents may include sulfur, nitrogen, oxygen, selenium, phosphorus, or combinations thereof. In one or more embodiments, the RAFT agent may include sulfur and one or more of the group consisting of nitrogen, oxygen, selenium, and phosphorus. Without intending to be bound by theory, the RAFT agents may be a xanthate and include sulfur to ensure chemical stability at temperatures greater than or equal to 100° C., greater than or equal to 120° C., greater than or equal to 140° C., or greater than or equal to 150° C.

The resulting branched block copolymer may, in one or more embodiments, be composed of a branched multi-block co-polymer. A general structure of branched multi-block copolymers disclosed herein is illustrated below.

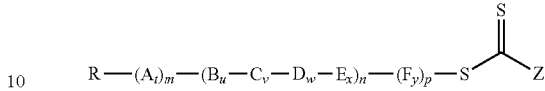

The resulting branched block copolymer may, in one or more embodiments, be composed of a branched multi-block co-polymer.

In embodiments, the treatment fluid may include from 0.5 to 10 pounds per barrel (lb/bbl), from 0.5 to 8 lb/bbl, from 0.5 to 6 lb/bbl, from 0.5 to 5 lb/bbl, from 0.5 to 4 lb/bbl, from 0.5 to 3.5 lb/bbl, from 0.5 to 3 lb/bbl, from 0.5 to 2.5 lb/bbl, from 0.5 to 2 lb/bbl, from 0.5 to 1 lb/bbl, from 1 to 10 lb/bbl, from 1 to 8 lb/bbl, from 1 to 6 lb/bbl, from 1 to 5 lb/bbl, from 1 to 4 lb/bbl, from 1 to 3.5 lb/bbl, from 1 to 3 lb/bbl, from 1 to 2.5 lb/bbl, from 1 to 2 lb/bbl, from 2 to 10 lb/bbl, from 2 to 8 lb/bbl, from 2 to 6 lb/bbl, from 2 to 5 lb/bbl, from 2 to 4 lb/bbl, from 2 to 3.5 lb/bbl, from 2 to 3 lb/bbl, from 2 to 2.5 lb/bbl, from 2.5 to 10 lb/bbl, from 2.5 to 8 lb/bbl, from 2.5 to 6 lb/bbl, from 2.5 to 5 lb/bbl, from 2.5 to 4 lb/bbl, from 2.5 to 3.5 lb/bbl, from 2.5 to 3 lb/bbl, from 3 to 10 lb/bbl, from 3 to 8 lb/bbl, from 3 to 6 lb/bbl, from 3 to 5 lb/bbl, from 3 to 4 lb/bbl, from 3 to 3.5 lb/bbl, from 3.5 to 10 lb/bbl, from 3.5 to 8 lb/bbl, from 3.5 to 6 lb/bbl, from 3.5 to 5 lb/bbl, from 3.5 to 4 lb/bbl, from 4 to 10 lb/bbl, or from 5 to 10 lb/bbl branched block copolymer based on the total weight of the treatment fluid.

Fluid rheology is an important parameter of treatment fluid performance. For critical offshore applications with extreme temperature and pressure requirements (such as temperatures greater than 200° C. and pressures greater than 1,000 pounds per square inch (psi)), the viscosity profile of the fluid often is measured with a controlled temperature and pressure rotational viscometer (for instance, an iX77 rheometer, commercially available from Fann Instruments (Houston, TX)). Fluids may be tested at temperatures of from 35° F. to 500° F., with pressures of up to 20,000 psi. Cold-fluid rheology may be important because of the temperatures less than 32° F. that the fluid is exposed to in deepwater risers. Temperatures greater than 100° F. may be encountered in deep wells or in geothermally heated wells. The fluid may be under pressures greater than 2,000 psi downhole, and its viscosity profile may change accordingly. The rheological behavior of the treatment fluid, such as gel strength, plastic viscosity, and yield point, may be determined from measurements of the Newtonian viscosity, shear stress, and shear rate.

The gel strength of a treatment fluid refers to the shear stress of the treatment fluid measured at a shear rate less than 10 RPM following a defined period of time during which the treatment fluid is maintained in a static state. The treatment fluids of the present disclosure may have a gel strength after 10 seconds of from 0.5 to 40 pounds force per 100 cubic feet (lb/100 ft$^2$). In some embodiments, the treatment fluid may have a gel strength after 10 seconds of from 5 to 40 lb/100 ft$^2$, from 5 to 32 lb/100 ft$^2$, from 5 to 30 lb/100 ft$^2$, from 5 to 25 lb/100 ft$^2$, from 5 to 20 lb/100 ft$^2$, from 5 to 16 lb/100 ft$^2$, from 5 to 13 lb/100 ft$^2$, from 5 to 12 lb/100 ft$^2$, from 5 to 11 lb/100 ft$^2$, from 5 to 10 lb/100 ft$^2$, from 5 to 8 lb/100 ft$^2$, from 5 to 6 lb/100 ft$^2$, from 6 to 40 lb/100 ft$^2$, from 6 to 32 lb/100 ft², from 6 to 30 lb/100 ft², from 6 to 25 lb/100 ft², from 6 to 20 lb/100 ft², from 6 to 16 lb/100 ft², from 6 to 13 lb/100 ft², from 6 to 12 lb/100 ft², from 6 to 11 lb/100 ft², from 6 to 10 lb/100 ft², from 6 to 8 lb/100 ft², from 8 to 40 lb/100 ft², from 8 to 32 lb/100 ft², from 8 to 30 lb/100 ft², from 8 to 25 lb/100 ft², from 8 to 20 lb/100 ft², from 8 to 16 lb/100 ft², from 8 to 13 lb/100 ft², from 8 to 12 lb/100 ft², from 8 to 11 lb/100 ft², from 10 to 40 lb/100 ft², from 10 to 32 lb/100 ft², from 10 to 30 lb/100 ft², from 10 to 25 lb/100 ft², from 10 to 20 lb/100 ft², from 10 to 16 lb/100 ft², from 10 to 13 lb/100 ft², from 10 to 12 lb/100 ft², from 10 to 11 lb/100 ft², from 11 to 40 lb/100 ft², from 11 to 32 lb/100 ft², from 11 to 30 lb/100 ft², from 11 to 25 lb/100 ft², from 11 to 20 lb/100 ft², from 11 to 16 lb/100 ft², from 11 to 13 lb/100 ft², from 11 to 12 lb/100 ft², from 12 to 40 lb/100 ft², from 12 to 32 lb/100 ft², from 12 to 30 lb/100 ft², from 12 to 25 lb/100 ft², from 12 to 20 lb/100 ft², from 12 to 16 lb/100 ft², from 12 to 13 lb/100 ft², from 13 to 40 lb/100 ft², from 13 to 32 lb/100 ft², from 13 to 30 lb/100 ft², from 13 to 25 lb/100 ft², from 13 to 20 lb/100 ft², from 13 to 16 lb/100 ft², from 15 to 40 lb/100 ft², from 15 to 32 lb/100 ft², from 15 to 30 lb/100 ft², from 15 to 25 lb/100 ft², from 15 to 20 lb/100 ft², from 20 to 40 lb/100 ft², from 20 to 32 lb/100 ft², from 20 to 30 lb/100 ft², from 20 to 25 lb/100 ft², from 25 to 40 lb/100 ft², from 25 to 32 lb/100 ft², from 25 to 30 lb/100 ft², from 30 to 40 lb/100 ft², from 30 to 32 lb/100 ft², or from 32 to 40 lb/100 ft².

Similarly, the treatment fluids of the present disclosure may have a gel strength after 10 minutes of from 0.5 to 50 lb/100 ft². In some embodiments, the treatment fluid may have a gel strength after 10 minutes of from 10 to 50 lb/100 ft², from 10 to 48 lb/100 ft², from 10 to 40 lb/100 ft², from 10 to 35 lb/100 ft², from 10 to 30 lb/100 ft², from 10 to 25 lb/100 ft², from 10 to 20 lb/100 ft², from 10 to 15 lb/100 ft², from 15 to 50 lb/100 ft², from 15 to 48 lb/100 ft², from 15 to 40 lb/100 ft², from 15 to 35 lb/100 ft², from 15 to 30 lb/100 ft², from 15 to 25 lb/100 ft², from 15 to 20 lb/100 ft², from 20 to 50 lb/100 ft², from 20 to 48 lb/100 ft², from 20 to 40 lb/100 ft², from 20 to 35 lb/100 ft², from 20 to 30 lb/100 ft², from 20 to 25 lb/100 ft², from 25 to 50 lb/100 ft², from 25 to 48 lb/100 ft², from 25 to 40 lb/100 ft², from 25 to 35 lb/100 ft², from 25 to 30 lb/100 ft², from 30 to 50 lb/100 ft², from 30 to 48 lb/100 ft², from 30 to 40 lb/100 ft², from 30 to 35 lb/100 ft², from 35 to 50 lb/100 ft², from 35 to 48 lb/100 ft², from 35 to 40 lb/100 ft², from 40 to 50 lb/100 ft², or from 40 to 48 lb/100 ft².

The rheological behavior of the treatment fluid may be determined by measuring the shear stress on the treatment fluid at different shear rates, which may be accomplished by measuring the shear stress or shear rate on the treatment fluid. The various shear rates are utilized as treatment fluid behaves as a rigid body at lesser shear stresses but flows as a viscous fluid at greater shear stresses. The rheology of the treatment fluid may be characterized by the plastic viscosity (PV) in centiPoise (cP) and the yield point (YP), which are parameters from the Bingham plastic rheology model. The PV is related to the resistance of the treatment fluid to flow due to mechanical interaction between the solids of the treatment fluid and represents the viscosity of the treatment fluid extrapolated to infinite shear rate. The PV reflects the type and concentration of the solids in the treatment fluid. The PV of a treatment fluid may be estimated by measuring the shear stress of the treatment fluid using the previously described rheometer at spindle speeds of 300 rotations per minute (RPM) and 600 RPM and subtracting the 300 RPM dial reading from the 600 RPM dial reading according to Equation 2:

$$PV\ (cP) = (\text{dial reading at 600 RPM}) - (\text{dial reading at 300 RPM}) \quad \text{Equation 2}$$

The treatment fluids of the present disclosure may have a PV of from 5 to 2000 cP. In some embodiments, the treatment fluid may have a PV of from 20 to 80 cP, from 20 to 75 cP, from 20 to 70 cP, from 20 to 65 cP, from 20 to 60 cP, from 20 to 55 cP, from 20 to 50 cP, from 20 to 45 cP, from 20 to 40 cP, from 20 to 35 cP, from 20 to 30 cP, from 20 to 25 cP, from 25 to 80 cP, from 25 to 75 cP, from 25 to 70 cP, from 25 to 65 cP, from 25 to 60 cP, from 25 to 55 cP, from 25 to 50 cP, from 25 to 45 cP, from 25 to 40 cP, from 25 to 35 cP, from 25 to 30 cP, from 30 to 80 cP, from 30 to 75 cP, from 30 to 70 cP, from 30 to 65 cP, from 30 to 60 cP, from 30 to 55 cP, from 30 to 50 cP, from 30 to 45 cP, from 30 to 40 cP, from 30 to 35 cP, from 35 to 80 cP, from 35 to 75 cP, from 35 to 70 cP, from 35 to 65 cP, from 35 to 60 cP, from 35 to 55 cP, from 35 to 50 cP, from 35 to 45 cP, from 35 to 40 cP, from 55 to 80 cP, from 55 to 75 cP, from 55 to 70 cP, from 55 to 65 cP, from 55 to 60 cP, from 60 to 80 cP, from 60 to 75 cP, from 60 to 70 cP, from 60 to 65 cP, from 65 to 80 cP, from 65 to 75 cP, from 65 to 70 cP, from 70 to 80 cP, from 70 to 75 cP, or from 75 to 80 cP.

The hydraulic fracturing fluid behaves as a rigid body when the shear stress is less than the YP, and the hydraulic fracturing fluid flows as a viscous fluid when the shear stress is greater than the YP. In other words, the YP represents the amount of stress required to move the treatment fluid from a static condition. The YP is expressed as a force per area, such as pounds of force per one hundred square feet (lb/100 ft²). YP provides an indication of the solids carrying capacity of the treatment fluid through the annulus, which in simplified terms gives an indication of the treatment fluid's hole-cleaning ability. A treatment fluid having a YP of equal to or greater than 15 lb/100 ft² is considered acceptable for drilling. The YP is determined by extrapolating the Bingham plastic rheology model to a shear rate of zero. The YP may be estimated from the PV (as measured in accordance with Equation 1, as previously described) according to Equation 3:

$$YP = (\text{dial reading at 300 RPM}) - PV \quad \text{Equation 3}$$

The treatment fluids of the present disclosure may have a YP of from 0.5 to 50 lb/100 ft². In some embodiments, the treatment fluids of the present disclosure may have a YP of from 25 to 75 lb/100 ft², from 25 to 70 lb/100 ft², from 25 to 65 lb/100 ft², from 25 to 60 lb/100 ft², from 25 to 55 lb/100 ft², from 25 to 50 lb/100 ft², from 25 to 45 lb/100 ft², from 25 to 40 lb/100 ft², from 25 to 35 lb/100 ft², from 25 to 30 lb/100 ft², from 30 to 75 lb/100 ft², from 30 to 70 lb/100 ft², from 30 to 65 lb/100 ft², from 30 to 60 lb/100 ft², from 30 to 55 lb/100 ft², from 30 to 50 lb/100 ft², from 30 to 45 lb/100 ft², from 30 to 40 lb/100 ft², from 30 to 35 lb/100 ft², from 35 to 75 lb/100 ft², from 35 to 70 lb/100 ft², from 35 to 65 lb/100 ft², from 35 to 60 lb/100 ft², from 35 to 55 lb/100 ft², from 35 to 50 lb/100 ft², from 35 to 45 lb/100 ft², from 35 to 40 lb/100 ft², from 40 to 75 lb/100 ft², from 40 to 70 lb/100 ft², from 40 to 65 lb/100 ft², from 40 to 60 lb/100 ft², from 40 to 55 lb/100 ft², from 40 to 50 lb/100 ft², from 40 to 45 lb/100 ft², from 45 to 75 lb/100 ft², from 45 to 70 lb/100 ft², from 45 to 65 lb/100 ft², from 45 to 60 lb/100 ft², from 45 to 55 lb/100 ft², from 45 to 50 lb/100 ft², from 50 to 75 lb/100 ft², from 50 to 70 lb/100 ft², from 50 to 65 lb/100 ft², from 50 to 60 lb/100 ft², from 50 to 55 lb$_f$/100 ft$^2$, from 55 to 75 lb$_f$/100 ft$^2$, from 55 to 70 lb$_f$/100 ft$^2$, from 55 to 65 lb$_f$/100 ft$^2$, from 55 to 60 lb$_f$/100 ft$^2$, from 60 to 75 lb$_f$/100 ft$^2$, from 60 to 70 lb$_f$/100 ft$^2$, from 60 to 65 lb$_f$/100 ft$^2$, from 65 to 75 lb$_f$/100 ft$^2$, from 65 to 70 lb$_f$/100 ft$^2$, or from 70 to 75 lb$_f$/100 ft$^2$.

In embodiments, the treatment fluids of the present disclosure may have a viscosity (also referred to as apparent viscosity (AV)) with continuous shearing at 510 s$^{-1}$ at 150° C. with constant pressure of 10,000 Psi of greater than 7 cP (1 cP=1 mPa·s), greater than 7.5 cP, greater than 8 cP, greater than 9 cP, greater than 10 cP, or greater than 11 cP over 1, 2, 3, 4, 5, 10, 15, or 20 hours. The treatment fluids of the present disclosure may have a viscosity with continuous shearing at 510 s$^{-1}$ at 150° C. with constant pressure of 10,000 Psi of from 7 to 20 cP, from 7 to 15 cP, from 7 to 12 cP, from 7 to 11.5 cP, from 7.5 to 20 cP, from 7.5 to 15 cP, from 7.5 to 12 cP, from 7.5 to 11.5 cP, from 8 to 20 cP, from 8 to 15 cP, from 8 to 12 cP, from 8 to 11.5 cP, from 9 to 20 cP, from 9 to 15 cP, from 9 to 12 cP, from 9 to 11.5 cP, from 10 to 20 cP, from 10 to 15 cP, from 10 to 12 cP, from 10 to 11.5 cP, from 10.5 to 20 cP, from 10.5 to 15 cP, from 10.5 to 12 cP, from 10.5 to 11.5 cP, from 11 to 20 cP, from 11 to 15 cP, from 11 to 12 cP, or from 11 to 11.5 cP over 1, 2, 3, 4, 5, 10, 15, or 20 hours.

EXAMPLES

The following examples illustrate features of the present disclosure but are not intended to limit the scope of the disclosure.

Example 1

In this study, two linear styrene-b-(ethylene-co-butylene)-b-styrene (SEBS) block copolymers with succinic anhydride grafted onto the soft segment were crosslinked and added to cement compositions. The SEBS block copolymers are commercially available from Kraton Corporation as Kraton™ FG 1901 and Kraton™ FG 1924, the properties of which are listed in Table 1. These SEBS block copolymers contained polystyrene as the hard segment end blocks, ethylene/butene copolymer as the soft segment, and has been grafted with about 2 wt. % maleic anhydride. The catalytic hydrogenation of maleic anhydride results in succinic anhydride. A styrene-b-(ethylene-propene)-b-styrene block copolymer without maleic anhydride is available as experimental product Kraton™ MD 8703 (EDF 10238). MD 8703 was used to evaluate the effect of the anhydride groups in improving the mechanical properties of the cement. The ethylene-propene segment was derived by hydrogenation of styrene-isoprene-styrene block copolymer.

TABLE 1

| Block copolymer properties. | | |
|---|---|---|
| Property | FG 1901 | FG 1924 |
| Styrene/rubber (wt. %) | 30/70 | 13/87 |
| Relative Molecular Weight (MW) | Low | Medium |
| MW of each styrene segment | 7500 | 13125 |
| MW of rubber segment | 37500 | 202000 |
| Bound succinic Anhydride (wt. %) | 1.4-2.0 | 1 |

TABLE 1-continued

| Block copolymer properties. | | |
|---|---|---|
| Property | FG 1901 | FG 1924 |
| Glass Transition Temperature, ° F. | −43.6 | −40 |
| Melt Flow Index (g/10 min) at 230° C. (ASTM D1238) | 22 | 40 |
| % Elongation at Break | 500 | 750 |
| Physical Form | Powder (Dusted with inorganic powder to prevent particle adhesion) | Powder (Dusted with inorganic powder to prevent particle adhesion) |
| Particle size | D$_{50}$ - 410 µm; D$_{10}$ - 276 µm; D$_{90}$ - 1350 µm | D$_{50}$ - 360 µm; D$_{10}$ - 260 µm; D$_{90}$ - 510 µm |
| Solid-Liquid Transition Temperature Range, ° F. | 215 | |

$^{13}$C nuclear magnetic resonance (NMR) and $^1$H NMR spectra of the three samples clearly indicated that the spectral pattern of the aromatic region of the spectra due the polystyrene segments was identical for each of MD 8703, FG 1901, and FG 1924, indicating that the succinic anhydride group was grafted onto the soft segment, which indicates regioselective substitution of the succinic anhydride group. Without intending to be limited by theory, it is believed that the succinic anhydride groups are chemoselectively substituted on secondary and tertiary carbons only. This is due to the abundance of methylene groups and methane groups in middle segment (compared to the amount of methyl groups), and the stability of secondary and tertiary radicals during the free radical initiated grafting of the succininic anhydride precursor (specifically, maleic anhydride).

The general structures of aminosilanes that are suitable for crosslinking the SEBS block copolymer are shown in Formula 2 and Formula 3. Specific examples of aminosilanes used in the study include 3-(2-aminoethylaminopropyl)trimethoxysilane and 3-aminopropyltriethoxysilane.

$$NH_2-(CH_2)_p-SiR_n(OR^1)_{3-n} \qquad \text{Formula 2}$$

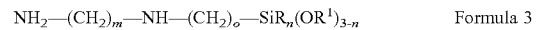

$$NH_2-(CH_2)_m-NH-(CH_2)_o-SiR_n(OR^1)_{3-n} \qquad \text{Formula 3}$$

The crosslinking reactions were performed on 100 g each of FG 1901 and FG 1924 by dropwise addition of the aminosilane. The amounts of aminosilane added are shown in Table 2. The crosslinked block copolymers were then rolled in a roller oven maintained at 180° F. for 3-4 hrs to obtain the product as a loose particulate material. 1 wt. % 3-(2-aminoethylaminopropyl)trimethoxysilane was added to FG 1901, which resulted in the FG 1901 Modified 1 sample. 1 wt. % 3-(2-aminoethylaminopropyl)trimethoxysilane was added to FG 1924, which resulted in the FG 1924 Modified 2 sample. 1.4 wt. % 3-aminopropyltriethoxysilane was added to FG 1924, which resulted in the FG 1924 Modified 3 sample.

TABLE 2

Amount of crosslinker added to each block copolymer.

| Sample Name | Block Copolymer | 3-(2-aminoethylaminopropyl) trimethoxysilane | 3-aminopropyl-triethoxysilane |
|---|---|---|---|
| FG1901-Modified 1 | FG 1901 | 1 g/100 g block copolymer | — |
| FG 1924 - Modified 2 | FG 1924 | 1.3 g/100 g block copolymer | — |
| FG 1924 - Modified 3 | FG 1924 | — | 1.4 g/100 g block copolymer |

After the crosslinking reactions were performed, the properties of the modified, crosslinked block copolymers were determined. These properties are shown in comparison to the original block copolymers in Table 3.

TABLE 3

Crosslinked block copolymer properties compared to original block copolymer properties.

| Property | FG 1901 | FG 1901 Modified 1 | FG 1924 | FG 1924 Modified 2 | FG 1924 Modified 3 |
|---|---|---|---|---|---|
| Styrene/rubber (wt. %) | 30/70 | 30/70 | 13/87 | 13/87 | 13/87 |
| Relative Molecular weight (MW) | Low | Low | Medium | Medium | Medium |
| MW of each styrene segment | 7500 | 7500 | 13125 | 13125 | 13125 |
| MW of rubber segment | 37500 | 37500 | 202000 | 202000 | 202000 |
| Bound succinic Anhydride (wt. %) | 1.4-2.0 | <1.4-2.0 | 1 | <1 | <1 |
| Glass Transition Temperature, °F. | −43.6 | Not measured | −40 | Not measured | Not measured |
| Melt Flow Index (g/10 min) at 230° C. (ASTM D1238) | 22 | Not measured | 40 | Not measured | Not measured |
| % Elongation at Break | 500 | Not measured | 750 | Not measured | Not measured |
| Physical Form | Powder (Dusted with inorganic powder to prevent particle adhesion) | Powder (dusting was retained from the parent sample) | Powder (Dusted with inorganic powder to prevent particle adhesion) | Powder (dusting was retained from the parent sample) | Powder (dusting was retained from the parent sample) |
| Particle size | $D_{50}$ - 410 μm; $D_{10}$ - 276 μm; $D_{90}$ - 1350 μm | $D_{50}$ - 376 μm; $D_{10}$ - 250 μm; $D_{90}$ - 480 μm | $D_{50}$ - 360 μm; $D_{10}$ - 260 μm; $D_{90}$ - 510 μm | $D_{50}$ - 880 μm; $D_{10}$ - 445 μm; $D_{90}$ - 1765 μm | $D_{50}$ - 280 μm; $D_{10}$ - <1 μm; $D_{90}$ - 420 μm |
| Solid-Liquid Transition Temperature Range, °F. | 215 | — | — | — | — |

Cement slurries comprising each of the samples were then prepared according to API Recommended procedures by adding blend of 713 grams API Class G Portland cement, 37 grams (5.2% BWOC) of crosslinked block copolymer and 0.3 grams of a copolymer of N,N-dimethylacrylamide and sodium 2-acrylamido-2-methyl propane sulfonate to 324 milliLiters mix water containing a defoamer.

A control slurry was prepared by mixing 713 grams API Class G Portland cement, 37 grams MD 8703, and 1 gram hydroxyethyl cellulose with 400 grams of water, cured and tested as described previously. A comparative slurry with no block copolymer was also prepared by mixing 800 grams API Class G Portland cement with 424 grams water and 1 gram hydroxyethyl cellulose.

The block copolymer slurry densities were designed to have densities of about 15.0 ppg. The slurries were poured into 2"×5" brass molds and cured at 180° F. under a pressure of 3000 psi for 4 days. The curing chamber was gradually depressurized after the heat was turned off. The cement cylinders were trimmed to obtain 2"×4" cylinders. The densities of the set cement samples containing block copolymers ranged from 14.6 to 15.0 ppg with no density segregation, indicating no cement settling or block copolymer separation.

Compressive strengths and elastic moduli were measured on the 2"×4" cement cylinders. Tensile strengths were measured using the split cylinder method with 2"×1" cement discs. The compressive strengths were measured by a Forney strength tester equipped with 250,000 pound load cell. The rate of pressurization for the compressive strength measurements was 266 pounds force per second (lb$_f$/s), and the rate of pressurization for the split cylinder tensile strength measurements was 33 lb$_f$/s. Self-healing of the cement compositions was measured by testing the fractured cylinders and cylindrical discs from compressive and tensile strength measurements. The cylinders and discs were wrapped individually in aluminum foil, and clamped with C-Clamps or adjustable ring clamps such that the fractured pieces were held together tightly. The cylinders and discs were placed in an oven at 200° F. for two days. The strength of adhesion was tested by manually attempting the break them apart for cylindrical discs and by measuring residual compressive strengths for the cylinders. The cyclic stress measurements were measured by cutting 2 inch by 4 inch cylinders into two equal cylindrical halves, followed by measuring the compressive strength of one cylinder, and using the strength values to set up the equipment for cyclic stress loading/unloading tests. The sample was subjected to cyclical stress loading and unloading between 90% and 20% of the compressive values of the other half. The compression was increased by 5 $lb_f$ at the end of every cycle. The number of cycles the sample withstood prior to failure was measured. The results are shown in Table 4.

and soft middle segments with regioselective and chemoselective succinic anhydride groups will provide, upon crosslinking with aminosilanes prior to the addition of the block copolymer to cement compositions, improved strength val-

TABLE 4

Cured cement properties.

| Property | MD 8703 Control | Comparative Cement with FG 1901 | Example Embodiment Cement with FG 1901 Modified 1 | Comparative Cement with FG 1924 | Example Embodiment Cement with FG 1924 Modified 2 | Example Embodiment Cement with FG 1924 Modified 3 |
|---|---|---|---|---|---|---|
| Density (ppg) | 15.5 | 15 | 15 | 15 | 15 | 15 |
| Compressive Strength, psi | 3750 | 4590 | 4685 | 3790 | 5190 | 4050 |
| Tensile Strength, psi | 240 | 420 | 500 | 400 | 505 | 500 |
| Elastic modulus, psi | $1.88 \times 10^6$ | $1.74 \times 10^6$ | $1.95 \times 10^6$ | $1.59 \times 10^6$ | $1.85 \times 10^6$ | $1.87 \times 10^6$ |
| Compressive strength of self-healed samples, psi | Not applicable | 1500 (average of 2 samples) | 400 (average of 2 samples) | 1415 (average of 2 samples) | 810 (average of 2 Samples) | — |
| % Compressive strength retained after self-healing | Not applicable | 33% | 9.0% | 37% | 16% | — |
| Number of Pressure cycles/ Number of samples tested | 1/3 | 1/1; 27/1 | 42/1 | 5/1; 182/1 | 260/1 | 437/1; >618/1 (sample did not break) |

Table 4 shows that self-healing ability of cement composition is significantly decreased when the succinic anhydride substituted block copolymers are crosslinked with aminosilanes. This is likely due to the crosslinking preventing complete melting of the block copolymer, which prevents the molten block copolymer from migrating into the fractures. However, the softening of the polystyrene phase to greater than the glass transition temperature allows the block copolymer to soften enough to deform sufficient to partially bridge the fractured surfaces.

Surprisingly, the results in Table 4 indicate that the elastic modulus, compressive strengths and tensile strengths are increased in the example embodiment cement compositions as compared to the cement compositions including non-crosslinked block copolymers. This is in contrast to the results when using conventional elastomers, such as ground automobile rubber powders. These conventional elastomers cause a significant decrease in compressive, tensile and flexural strength values, as well as elastic modulus, in a cement composition.

Furthermore, the example embodiment cement compositions result in an improved cyclic stress resistance of the cement composition in comparison to the other samples. Therefore block copolymers comprising hard end segments ues and cyclic stress resistance while retaining self-healing properties both in the presence and in the absence of swelling solvents.

Example 2

The swelling of the various block copolymer samples in various solutions in shown in Table 5. The solutions were diesel, chloroform, xylenes and Aromatic 200. Aromatic 200 was produced by CISCO Chemicals and included from 50 to 85 wt. % C11 to C14 aromatic hydrocarbons, from 5 to 20 wt. % naphthalene, from 5 to 15 wt. % C10 aromatic hydrocarbons not including naphthalene, and from 5 to 15 wt. % C15 to C16 aromatic hydrocarbons. The swelling was measured by adding about 10 ml of solution to 0.26 g crosslinked copolymer and storing the mixture at room temperature for a minimum of 4 hrs. The excess solvent was removed by decanting, and the swollen rubber solid was blotted with a paper towel and weighed. The weight was divided by dry weight and multiplied by 100 to determine the percentage of swelling. The tests including FG1901 Modified 1 and FG 1924 Modified 2 in aromatic 200 solvent were not conducted, and the test including FG 1924 Modified 3 in xylenes solvent was not conducted. The results of the tests conducted are shown in Table 5.

TABLE 5

Block copolymer swelling and dissolving properties in various solvents.

| Solvent | FG1901 | FG 1901 Modified 1 | FG 1924 | FG 1924 Modified 2 | FG 1924 Modified 3 |
|---|---|---|---|---|---|
| Diesel | Dissolves | 680% | Dissolves | 1060% | 1020% |
| Xylenes | Dissolves | 700% | Dissolves | 930% | Not determined |
| Aromatic 200 | Dissolves | Not determined | Dissolves | Not determined | 825% |
| Chloroform | Dissolves | 1040% | Dissolves | 1570% | 1460% |

The results in Table 5 show that the FG 1901 Modified 1 and FG 1924 Modified 2 samples both swell in diesel, xylenes, and chloroform. The FG 1924 Modified 3 sample swells in diesel, aromatic 200, and chloroform. Therefore, without intending to be bound by theory, it is likely that cement compositions including these samples would also swell in the presence of these solutions. Therefore, by injecting suitable solvents, with properties similar to the solutions used in this experiment, into fractures in cured cement, the fractures may be sealed effectively due to expected swelling in the cement.

Example 3

In this study, xanthate was chosen as the preferred photoiniferter. Under mild UV irradiation ($\lambda_{max}$=365 nm, intensity=7.2 mW/cm$^2$), xanthate undergoes a spin-forbidden n to π* transition which affords rapid photocleavage to generate carbon and sulphur radicals. As xanthate has very low solubility in water, acrylic acid was polymerized with xanthate under UV light irradiation to generate poly(acrylic acid) capped with xanthate end-group (PAA-Xanthate) that can act as macromolecular chain transfer agent in aqueous solution. This synthesis afforded near-complete acrylic acid consumption (~97%) based on 500 MHz $^1$H NMR analysis with molecular weight of 4 800 g/mol based on SEC-MALS analysis. The PAA-Xanthate was used as the precursor block to synthesize various UHMW block copolymer in water.

The synthesis of poly(acrylic acid) via UV-mediated RAFT/MADIX polymerization was then done. A reaction stock solution consisting of water (2 mL), ethanol (2 mL), acrylic acid (AA) (2 mL, 29.17 mmol, 2.102 g), and xanthate (0.925 mmol, 0.1927 g, MW=208.3) was prepared in 8 mL vial with a stir bar and covered in aluminum foil (AA: Xanthate=32:1). The vial was then sealed with a septum before being sparged under nitrogen for 20 minutes. The mixture was then irradiated in a UV photoreactor ($\lambda_{max}$=365 nm, 7.2 mW/cm$^2$) under constant magnetic stirring. The reaction was carried out for 30 minutes. The final mixture was then analyzed with 500 MHz $^1$H NMR and SEC-MALS to determine monomer conversion and polymer molecular weight and molecular weight distributions.

The synthesis of UHMW-BCP-1 was then done. A reaction stock solution consisting of water (30 mL), DMA (52.4 mmol, 5.194 g, 5.4 mL), AMPS (6.29 mmol, 1.297 g), MBA (16.22 μmol, 0.0025 g) and PAA-MacroCTA (22 μL pipetted from the final reaction mixture of poly(acrylic acid) described above provided a dry mass of 11 mg and $M_{n,SEC-MALS}$ of 4800 g/mol which was used as the polymer molecular weight leading to a molar composition of 2.292 μmol) was prepared in 50 mL round bottomed flask with a stir bar covered in aluminum foil (DMA:AMPS:MBA: PAA=22 860:2731:7:1). After 10 minutes of stirring, the reaction mixture was distributed into four 20 mL sample vials with stir bars. One of the vials was then sealed with septa before being sparged under nitrogen for 20 minutes. The mixture was then irradiated in a UV photoreactor ($\lambda_{max}$=365 nm, 7.2 mW/cm$^2$). A reaction diagram is shown in FIG. 19 illustrating the aforementioned steps. The reaction was carried out for 8 minutes. Aliquots of the reaction mixture were taken at specific time points (2, 4, 6, and 8 minutes) during the reaction to determine monomer conversions through $^1$H NMR analysis, and to determine number average molecular weights ($M_n$) and polydispersities ($M_w/M_n$) through SEC-MALS analysis using 0.1 M sodium nitrate (NaNO$_3$) buffer (FIG. 8A-C & Table 6).

TABLE 6

Kinetics for polymerization of N,N-Dimethylacrylamide (DMA), 2-Acrylamido-2-methyl-1-propanesulfonic acid (AMPS), and N,N'-methylenebis(acrylamide) (MBA) under UV light mediated by poly(acrylic acid) terminated with xanthate as the macro chain transfer agent (PAA-macroCTA).[a]

| no. | Exp. Cond.[a] [DMA]:[AMPS]:[MBA]:[PAA-Xanthate] | Time (min) | α[b] (%) | $M_{n,SEC-MALS}$[c] (g/mol) | $M_w/M_n$[c] |
|---|---|---|---|---|---|
| 1 | 22860:2731:7:1 | 2 | 5 | 1 784 000 | 1.46 |
| 2 | 22860:2731:7:1 | 4 | 20 | 2 167 000 | 1.47 |
| 3 | 22860:2731:7:1 | 6 | 25 | 3 564 000 | 1.55 |
| 4 | 22860:2731:7:1 | 8 | 37 | 4 656 000 | 1.68 |

Note:
[a]Reactions were performed in the absence of oxygen at ambient temperature with monomer concentrations of 1.656M in water. Polymerization was carried out under mild UV light ($\lambda_{max}$ = 365 nm, intensity = 7.2 mW/cm$^2$).
[c]Absolute number-average molecular weights ($M_{n,SEC-MALS}$) and polydispersity index were determined by SEC equipped with multi-angle light-scattering detector assuming 100% mass recovery.

The reaction was then repeated without performing any kinetic analysis with the sample being irradiated for 60 minutes to ensure complete monomer conversion, which resulted in the formation of a macrogel. The macrogel was then mechanically sheared to generate polymeric nanogels (microgels). The final sample was then analyzed through gravimetric analysis to determine monomer conversion (>99%), followed by SEC-MALS analysis in 0.05 M sodium bicarbonate ($NaHCO_3$), 0.1 M sodium nitrate ($NaNO_3$), and 0.02 M triethylamine (TEA) with pH 9.656 buffer to determine polymer molecular weight and molecular weight distributions (FIG. 10A), $^1$H NMR analysis (FIG. 9) and FTIR analysis (FIG. 10) to determine the chemical composition, DLS analysis (FIG. 11) to determine the hydrodynamic volume of the polymeric nanogels (microgels), and TGA analysis on the dry polymer to determine the thermal stability (FIG. 12).

Based on FIG. 10, the broad absorption band at 3450-3500 $cm^{-1}$ corresponds to N—H stretching from amide group and hydrogen bonding between carbonyl groups and hydroxyl groups of water, the absorption band at 2927 $cm^{-1}$ corresponds to C—H stretch, the absorption bands at 1630 and 1723 $cm^{-1}$ correspond to C=O stretch, the absorption bands at 1612 and 1400 $cm^{-1}$ correspond to amide bands, bands at 1498 and 1355 $cm^{-1}$ correspond to $CH_3$ deformation vibration, and the absorption band at 1035 $cm^{-1}$ correspond to S=O groups of sulfonic acid.

Based on FIG. 11, DLS analysis was carried out on UHMW-BCP-1 which was mechanically sheared to generate microgels. The UHMW-BCP-1 was then diluted in water to generate a concentration of 0.477 wt % with the pH adjusted between pH 9-10 with sodium hydroxide. The microgel has a particle diameter of 290 nm and moderate particle dispersity of 23.9%.

The UHMW-BCP-1 with concentration of 0.477 wt % was prepared by mechanical shearing and hot rolling (150° C. for 16 hours at 500 Psi in a pressure cell) of macrogel (left) synthesized after 1 hr mild UV irradiation. The initial mass loss of up to 100° C. can be attributed to the loss of water trapped in the dry polymer and water hydrating the surface of the dry polymer. The polymer then remains temperature stable, without any mass loss, from 100° C. to 225° C. Heating the dry UHMW-BCP-1 above 225° C. led to continuous loss of mass due to degradation of functional moiety on the pendant groups.

Example 4

Rheological analysis and thermal and chemical stability of UHMW branched block copolymer (UHMW-BCP-1) in water at high temperature and high pressure (HTHP) was conducted. UHMW-BCP-1 formed soft macrogel due to the presence of MBA crosslinkers. Formation of the macrogel was done intentionally for UHMW-BCP-1 to ensure complete consumption of monomers. The branched block copolymers continue to grow beyond the gelation point as the photoiniferter approach affords polymer chain growths that favor reversible termination over degenerative chain transfer at high viscosities. Furthermore, in the absence of external initiators, the UHMW branched block copolymers continue to grow with low probabilities of termination by low molecular weight chains. Upon reaching complete monomer conversions, macrogel of UHMW-BCP-1 was then mechanically sheared in a mixer with additional water to break the macrogel. UHMW-BCP-1 formed polymer particles with hydrodynamic diameters of 290 nm (FIG. 11) based on DLS measurements.

Viscosity measurements of UHMW-BCP-1 polymer and partially hydrolyzed polyacrylamide (PHPA) were carried out in an Anton Paar MCR-302 Rheometer fitted with a CC25 Pressure Cell. The UHMW-BCP-1 was conditioned by hot rolling the sample at 150° C. in a pressure cell at 500 Psi for 16 hours. The polymer was prepared at concentrations of 0.477 wt % in water with pH adjusted to pH 9-10 using sodium hydroxide before hot rolling. A similar conditioning was carried out with a commercial PHPA sample at 50° C. to avoid polymer degradation at high temperature. The viscosities of the different solutions were measured at a constant shear rate of 510 $s^{-1}$ from 30° C. to 150° C. at a heating rate of 0.5° C./min under 500 Psi pressure.

FIG. 13 shows viscosity measurements UHMW-BCP-1 and commercial PHPA polymer. Viscosity profiles at various temperatures for polymers (0.477 wt % in water, pH 9-10) measured in an Anton Paar MCR-302 Rheometer fitted with a CC25 Pressure Cell at 500 Psi and at a constant shear rate of 510 $s^{-1}$.

Comparison of the branched block copolymer with PHPA revealed that at similar concentrations, UHMW-BCP-1 provided a higher solution viscosity over PHPA. SEC-MALS analysis revealed that UHMW-BCP-1 ($M_{n,SEC\text{-}MALS}$=9.077× $10^6$ g/mol, FIG. 14A) has higher molecular weights than PHPA ($M_{n,SEC\text{-}MALS}$=7.433×$10^6$ g/mol). In addition, the crosslinked branched block copolymer microgels preserve a nearly fixed conformation in solution in comparison to PHPA. The rigidity of UHMW-BCP-1 provided better thermal stability with increasing temperatures and mechanical stability under high mechanical stress from high shear rate applied. However, the linear nature of the PHPA used subjected the polymer to hydrolysis and mechanical degradation that was intensified with increasing temperatures leading to lower solution viscosity.

Viscometry studies at high temperature (150° C. & 175° C.) and high pressure (10 000 Psi) at a constant shear rate of 510 $s^{-1}$ were carried out with Fann iX77 Rheometer equipped with a Model D4004 Chiller. The UHMW-BCP-1 and PHPA were conditioned by hot rolling these samples at 50° C. in a pressure cell at 500 Psi for 16 hours. These polymers were prepared at a 0.477 wt % in water with pH adjusted to pH 9-10 using sodium hydroxide before hot rolling.

In order to simulate downhole conditions encountered during polymer flooding, UHMW-BCP-1 and PHPA were prepared for HTHP shear degradation studies in Fann iX77 Rheometer. In this study, UHMW-BCP-1 and PHPA were sheared at 510 $s^{-1}$ at a temperature of 150° C. and a confined pressure of 10 000 Psi for a period of 9 hours. As demonstrated in FIG. 15, commercial PHPA thins to viscosity similar to water, but the UHMW-BCP-1 provided a much higher viscosity at 150° C. and even at 175° C. Under HTHP conditions, the differences in the observed viscosities for UHMW-BCP-1 and PHPA could be related back to their thermal and mechanical stability. The thermal and mechanical stability of the UHMW-BCP-1 and PHPA at HTHP conditions were analyzed with SEC-MALS before and after hot rolling (FIGS. 14A and 14B). A thermally stable viscosifier should have overlapping polymer molecular weight plots before and after hot rolling at 150° C. This is clearly seen for UHMW-BCP-1 in FIG. 14A with the polymer molecular weight plots before hot rolling (BHR) and after hot rolling (AHR) overlap quite well. On the other hand, the polymer molecular weight plot for PHPA (FIG. 14B) before hot rolling (BHR) underwent significant changes in terms of its profile after hot rolling (AHR). The polymer profile of PHPA after hot rolling showed multimodal peaks at later retention times that could be attributed to lower molecular weight chains generated from chain scission and chain hydrolysis. The lack of thermal and mechanical stability of PHPA led to loss of viscosity seen in FIG. 15.

Example 5

A Fann 35 rheological comparison of UHMW-BCP-1 and PHPA under saline condition—sea water and 3 wt % KCl was conducted. Rheological comparisons of branched block copolymer (UHMW-BCP-1) with powdered PHPA was carried out in sea water and 3 wt % KCl. These products were mixed in sea water and 3 wt % KCl according to the formulations shown in Tables 7 and 8. The pH of these solutions were then adjusted with magnesium oxide and maintained between pH 9-11. Rheological studies with Fann 35 were carried out at 120° F. before and after hot rolling at 300° F. for 16 hours in a pressure cell.

Plastic viscosity (PV) is the resistance to the flow of fluid. A low plastic viscosity value is an indicator that the treatment fluid is capable of drilling rapidly because of the low viscosity of the treatment fluid exiting the drill bit. Yield point (YP) values evaluate the ability of a treatment fluid to lift cuttings out of the annulus. A higher yield point indicates that the treatment fluid is able to carry cuttings better than fluid of similar density with a lower yield point.

Gel strength demonstrates the ability of the treatment fluid to suspend drill solid and weighting material when circulation is ceased. Gel strength measurement is made on viscometer using the 3-rpm reading, which will be recorded after stirring the treatment fluid at 600 rpm to break the gel. The first reading is noted after the treatment fluid is in a static condition for 10 seconds. The second reading will be 10 minutes after static conditions. The 6 and 3 rpm numbers are also good indicators of treatment fluids that under static conditions are capable of suspending barite and drill cuttings. The formulation and viscosity measurement results are shown below in Table 7.

TABLE 7

Formulation and viscometer results.

| Fluid formulations (lb/bbl): | UHMW-BCP-1 | PHPA |
|---|---|---|
| Water/SSW - 50/50 wt % | 350 | 350 |
| MgO | 3 | 3 |
| Aramco Viscosifier | 3.25 | — |
| Powdered PHPA | — | 3.25 |
| RevDust | 30 | 30 |
| Aging temp., ° F. | 200 | 200 |
| Aging conditions | rolling | rolling |
| Aging period, hr | 16 | 16 |
| pH before aging | 9 | 9 |

Fann 35

| | Temperature. ° F. | | | |
|---|---|---|---|---|
| | 120 | | 120 | |
| Conditions | BHR | AHR | BHR | AHR |
| 600 rpm | 112 | 99 | 34 | 30 |
| 300 rpm | 73 | 65 | 22 | 18 |
| 200 rpm | 57 | 52 | 16 | 14 |
| 100 rpm | 39 | 35 | 9 | 8 |
| 6 rpm | 12 | 11 | 1 | 3 |
| 3 rpm | 10 | 9 | 1 | 2 |
| 10 sec. gel, lb/100 ft2 | 9 | 8 | 1 | 2 |
| 10 min. gel, lb/100 ft2 | 20 | 11 | 2 | 2 |
| AV, cP | 56 | 50 | 17 | 15 |
| PV, cP | 39 | 34 | 12 | 12 |
| YP, lb/100 ft2 | 34 | 31 | 10 | 6 |

Rheological data for polymers in sea water from Fann 35 at 120° F. for the different solutions before and after hot rolling at 200° F. for 16 hours in a pressure cell pressurized at 500 Psi is shown in FIGS. 16A and 16B. FIG. 16A shows the plasticity viscosity and FIG. 16B shows the yield point for the 4 different products before (BHR) and after hot rolling (AHR).

At similar loadings, UHMW-BCP-1 provided higher viscosity in sea water compared to PHPA as UHMW-BCP-1 demonstrated high plastic viscosity, yield point, and 10 s/10 min gel strengths than PHPA.

Rheological properties in 3 wt % KCl brine were also studied with the branched block copolymer additive and powdered PHPA. These additives were mixed in 3 wt % KCl brine solution according to the formulations shown in Table 8. The pH of these solutions were then adjusted with caustic soda and maintained between pH 10-11. Rheological studies with Fann 35 were carried out at 120° F. before and after hot rolling at 300° F. for 16 hours in a pressure cell. The formulation and viscosity measurement results are shown below in Table 8.

TABLE 8

Formulation and viscometer results.

| Fluid formulations (lb/bbl): | PHPA | UHMW-BCP-1 |
|---|---|---|
| Water | 276.5 | 276.5 |
| Caustic Soda | 0.1 | 0.1 |
| KCl | 8 | 8 |
| Powdered PHPA | 3.25 | — |
| UHMW-BCP-1 | — | 3.25 |
| Aging temp. ° F. | 300 | 300 |
| Aging conditions | rolling | rolling |
| Aging period, hr | 16 | 16 |
| pH before aging | 11 | 11 |

Fann 35

| | Temperature. ° F. | | | |
|---|---|---|---|---|
| | 120 | | 120 | |
| Conditions | BHR | AHR | BHR | AHR |
| 600 rpm | 57 | 25 | 92 | 110 |
| 300 rpm | 40 | 14 | 62 | 78 |
| 200 rpm | 33 | 10 | 48 | 60 |
| 100 rpm | 25 | 6 | 32 | 39 |
| 6 rpm | 9 | 2 | 7 | 8 |
| 3 rpm | 7 | 1 | 5 | 6 |
| 10 sec. gel, lb/100 ft2 | 8 | 2 | 5 | 7 |
| 10 min. gel, lb/100 ft2 | 8 | 2 | 5 | 7 |
| AV, cP | 29 | 13 | 46 | 55 |
| PV, cP | 17 | 11 | 30 | 34 |
| YP, lb/100 ft2 | 23 | 3 | 32 | 42 |

Based on the Fann 35 rheology before hot rolling, the branched block copolymer provided a much higher plastic viscosity (FIG. 17A) and yield point (FIG. 17B) compared to powdered PHPA in 3 wt % KCl solution. Upon hot rolling at 300° F. for 16 hours, there were no observable changes in the plastic viscosity and yield point for the branched block copolymer. On the other hand, the liquid and powdered PHPA underwent a partial degradation similar to observations made for these additives in fresh water. The branched block copolymer not only enhanced the plastic viscosity and yield point of the fluid at similar loadings when compared to commercial additive such as powdered PHPA, but it also provided a reliable and consistent plastic viscosity and yield point after being subjected to a high temperature aging under brine conditions.

Rheological data from Fann 35 at 120° F. for the different polymer solutions before and after hot rolling at 300° F. for 16 hours in a pressure cell pressurized at 500 Psi is shown in FIGS. 17A and 17B. FIG. 17A shows the plasticity viscosity and FIG. 17B shows the yield point for the 3 different products before (BHR) and after hot rolling (AHR).

Shear stability properties of the UHMW-BCP-1 at high temperature and pressure in 3 wt % KCl were also studied with powdered PHPA as a comparison using similar formulations as in FIG. 18. The fluids for this study were prepared by adding the viscosifiers in 3 wt % KCl based on the formulation provided in Table 8 and adjusting the pH with caustic soda to pH 9-10. These fluids were then hot rolled for 16 hours at 120° F. before proceeding to shear testing with Fann ix77. The low temperature hot rolling ensured that minimum degradation was seen for powdered PHPA. Fann 77 was then used to shear the fluids at 510 s$^{-1}$ at a temperature of 150° C. with confined pressure of 10 000 Psi. Based on FIG. 18, at 150° C., the PHPA powder (blue line) quickly dropped in viscosity and reaching to viscosity of water, but the branched block copolymer (green line) maintained higher viscosity.

The following description of the embodiments is illustrative in nature and is in no way intended to be limiting it its application or use. As used throughout this disclosure, the singular forms "a," "an" and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of polymer flooding within a sandstone formation the method comprising:
   injecting a treatment fluid composition into a wellbore, the treatment fluid composition comprising a base fluid and a viscosifier comprising a branched block copolymer wherein the branched block copolymer is a crosslinked, polymerized reaction product of crosslinker C and monomer A and monomer B and monomer D; and
   increasing hydrocarbon production from the wellbore, wherein
   the crosslinker C is N,N-methylene bis(acrylamide), and
   the monomer A, the monomer B, and the monomer D are chosen from the group consisting of acrylic acid, 2 acrylamido 2 methylpropane sulfonic acid, 2 acrylamido ethyl phosphonic acid, maleic acid, N,N dimethylacrylamide, (3 acrylamidopropyl)trimethylammonium chloride, 2 hydroxyethyl acrylate, styrene 4 sulfonic acid sodium salt, adenosine monophosphate, poly(ethylene glycol) methyl ether acrylate, and lauryl acrylate.

2. The method of claim 1, wherein the treatment fluid comprises from 0.5 to 10 lb/bbl of the branched block copolymer.

3. The method of claim 1, wherein the treatment fluid comprises from 0.5 to 2 lb/bbl of the branched block copolymer.

4. The method of claim 1, wherein the branched block copolymer has a number averaged molecular weight of greater than 3000 g/mol.

5. The method of claim 1, wherein monomer A is acrylic acid and monomer B is N,N dimethylacrylamide and monomer D is 2 acrylamido 2 methylpropane sulfonic acid.

6. The method of claim 1, in which the treatment fluid composition further comprises at least one additive chosen from a thinner, a weighting material, a fluid-loss additive, or an alkali compound.

7. The method of claim 1, in which the treatment fluid composition has a yield point of from 1 lbf/100 ft$^2$ to 100 lbf/100 ft$^2$ and a 10-second gel strength of from 1 lbf/100 ft$^2$ to 30 lbf/100 ft$^2$.

8. The method of claim 1, wherein the crosslinked polymerized reaction product comprises:
   a plurality of block copolymer segments of monomer A and monomer B interconnected via crosslinker C;
   a plurality of block copolymer segments of monomer A, monomer B, and monomer D interconnected via crosslinker C; or
   combinations thereof.

9. The method of claim 1, wherein the treatment fluid composition has a viscosity with continuous shearing at 510 s$^{-1}$ at 150° C. with constant pressure of 10,000 Psi of from 7 to 20 cP.

10. The method of claim 1, in which the base fluid is an aqueous base fluid.

11. The method of claim 1, in which the treatment fluid composition has a yield point of from 25 lbf/100 ft$^2$ to 50 lbf/100 ft$^2$ and a 10-second gel strength of from 5 lbf/100 ft$^2$ to 13 lbf/100 ft$^2$.

12. The method of claim 1, in which the treatment fluid composition has a plastic viscosity of 20 to 50 cP.

13. The method of claim 1, in which the treatment fluid composition has a 10-minute gel strength of from 10 lbf/100 ft$^2$ to 30 lbf/100 ft$^2$.

* * * * *